US008376768B2

(12) United States Patent
Kurumizawa et al.

(10) Patent No.: US 8,376,768 B2
(45) Date of Patent: Feb. 19, 2013

(54) LOCKING DEVICE FOR POWER FEEDING PLUG

(75) Inventors: Naoto Kurumizawa, Aichi (JP); Toshiharu Katagiri, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 27 days.

(21) Appl. No.: 13/101,819

(22) Filed: May 5, 2011

(65) Prior Publication Data

US 2011/0281452 A1 Nov. 17, 2011

(30) Foreign Application Priority Data

May 12, 2010 (JP) ................................. 2010-110564

(51) Int. Cl.
*H01R 13/62* (2006.01)
(52) U.S. Cl. ........................................................ 439/304
(58) Field of Classification Search .................. 439/304, 439/310, 133, 352–358
See application file for complete search history.

(56) References Cited

U.S. PATENT DOCUMENTS

| 3,270,267 A | * | 8/1966 | Nolte, Jr .......................... 320/138 |
| 5,306,999 A | * | 4/1994 | Hoffman ........................ 320/109 |
| 5,478,250 A | * | 12/1995 | Hoffman ........................ 439/142 |
| 5,545,049 A | * | 8/1996 | Hasegawa et al. ............ 439/310 |
| 5,584,715 A | * | 12/1996 | Ehrenfels ....................... 439/222 |
| 5,627,448 A | * | 5/1997 | Okada et al. .................... 439/133 |
| 5,639,256 A | * | 6/1997 | Endo et al. ..................... 439/358 |
| 5,664,960 A | * | 9/1997 | Fukushima .................... 439/310 |
| 5,674,086 A | * | 10/1997 | Hashizawa et al. ........... 439/310 |
| 5,751,135 A | * | 5/1998 | Fukushima et al. ........... 320/107 |
| 5,873,737 A | * | 2/1999 | Hashizawa et al. ............. 439/39 |
| 5,906,500 A | * | 5/1999 | Kakuta et al. .................. 439/310 |
| 6,123,569 A | * | 9/2000 | Fukushima et al. ........... 439/456 |
| 6,179,654 B1 | * | 1/2001 | Witkowski et al. ............ 439/550 |
| 8,016,604 B2 | * | 9/2011 | Matsumoto et al. .......... 439/304 |
| 8,025,526 B1 | * | 9/2011 | Tormey et al. ................. 439/528 |
| 8,075,329 B1 | * | 12/2011 | Janarthanam et al. ........ 439/304 |
| 8,197,277 B1 | * | 6/2012 | Teichmann .................... 439/304 |
| 8,206,184 B2 | * | 6/2012 | Kwasny et al. ................ 439/695 |

FOREIGN PATENT DOCUMENTS

JP 9-161898 A 6/1997

* cited by examiner

*Primary Examiner* — Alexander Gilman
(74) *Attorney, Agent, or Firm* — Patterson Thuente Christensen Pedersen, P.A.

(57) ABSTRACT

A locking device for a power feeding plug that prevents unauthorized removal of the power feeding plug from an inlet. The locking device includes a lock mechanism that locks the power feeding plug to the inlet. The lock mechanism includes an actuator and a lock member pivotable by the actuator between a lock position, at which the lock member locks the power feeding plug to the inlet, and an unlock position.

20 Claims, 16 Drawing Sheets

LOCKING DEVICE FOR POWER FEEDING PLUG

CROSS-REFERENCE TO RELATED APPLICATIONS

This application is based upon and claims the benefit of priority from prior Japanese Patent Application No. 2010-110564, filed on May 12, 2010, the entire contents of which are incorporated herein by reference.

BACKGROUND OF THE DISCLOSURE

The present invention relates to a locking device that locks a power feeding plug to a power feeding connector.

People have become environmentally conscious in recent years. As a result, vehicles with reduced carbon dioxide emissions, such as hybrid vehicles and electric vehicles, have become popular. Such a vehicle uses a battery to power a motor, which produces rotation, and runs mainly using the drive force of the motor. When the vehicle travels over a long distance, the battery's state of charge becomes low. Whenever the state of charge becomes low, the battery must be charged.

The battery may be charged, for example, at a local charging station. The battery may also be charged using a household charging cable connected to a household outlet. In any case, a power feeding plug, which is connected to a distal end of a charging cable, is used for charging. Japanese Laid-Open Patent Publication No. 9-161898 describes the structure of such a power feeding plug. When the power feeding plug is connected to an inlet of a vehicle, power flows through a cable to the vehicle and charges the battery. The power feeding plug, which also serves as the part of the cable that is grasped, is inserted into the inlet like when refueling a gasoline engine vehicle.

An electrolytic reaction of compounds and ions in battery cells, which form the battery, charges the battery. Thus, the charging time is relatively long. Although fast charging technology is being developed, the time required to charge the battery of an electric vehicle is still relatively long. As a result, until charging is completed, the vehicle may be left unattended over a long period of time with the power feeding plug connected to the inlet of the vehicle. In such a case, someone may wrongfully remove the power feeding plug and connect it to another vehicle to steal electricity.

To solve this problem, a locking device is used to lock the power feeding plug to the inlet of the vehicle. This prevents unauthorized removal of the power feeding plug from the power receiving connector. The locking device requires the user's authorization to remove the power feeding plug from the inlet. This prevents the power feeding plug from being used to steal electricity.

In such a locking device, a restriction member, such as a movable lock bar, may be used to lock and prohibit removal of the power feeding plug. However, when using such a lock bar, the locking device requires a space to allow for movement of the lock bar. This enlarges the locking device.

SUMMARY OF THE DISCLOSURE

The present invention provides a locking device for power feeding plug that allows for reduction in size.

One aspect of the present invention is a locking device for a power feeding plug that prevents unauthorized removal of the power feeding plug from an inlet. The locking device includes a lock mechanism that locks the power feeding plug to the inlet. The lock mechanism includes an actuator, which generates drive force, and a lock member, which includes a planar surface. The lock member is pivotable in a plane that is parallel to the planar surface by the drive force of the actuator so that the lock member is pivoted to a lock position at which the lock member locks the power feeding plug to the inlet.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE INVENTION

First Embodiment

A locking device for a power feeding plug according to one embodiment of the present invention will now be described with reference to FIGS. 1 to 15.

Figure 1:
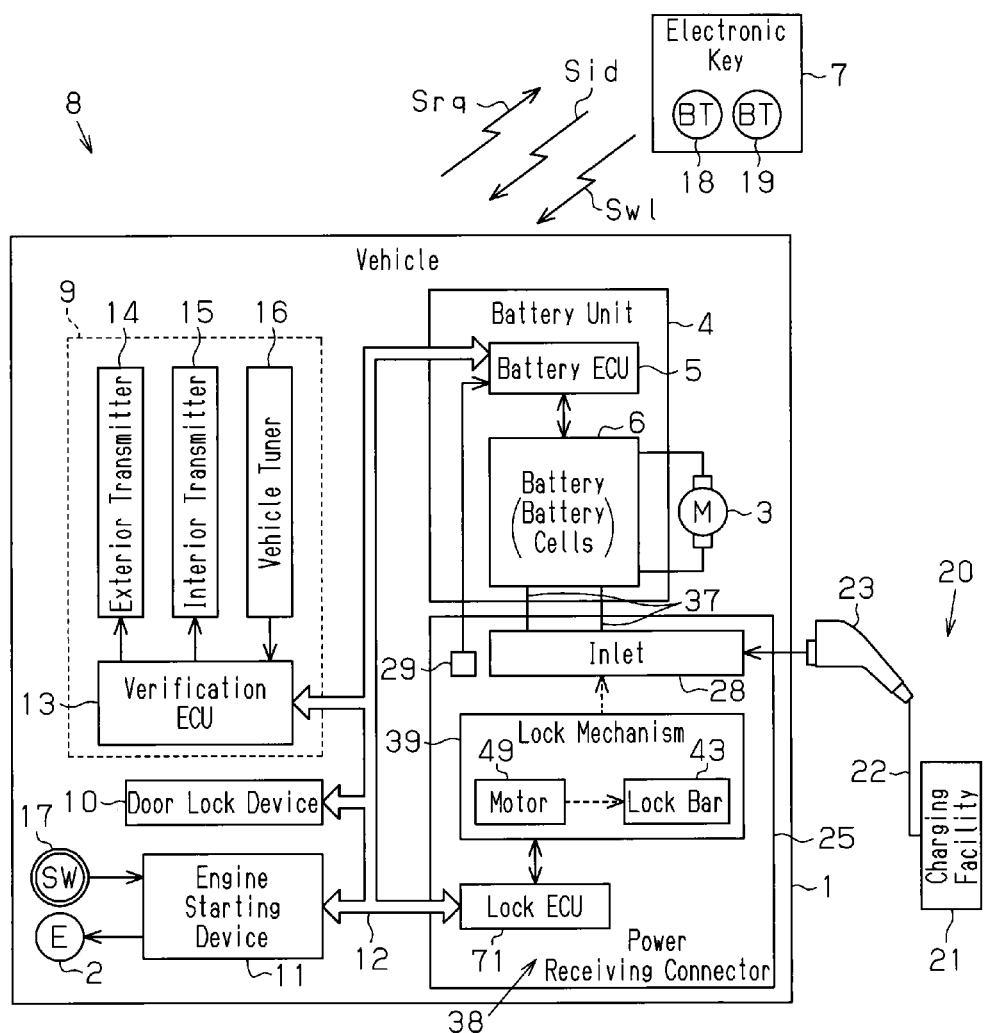
FIG. 1 is a schematic block diagram showing a locking device for a power feeding plug according to one embodiment of the present invention.

Referring to FIG. 1, a hybrid vehicle (hereinafter referred to as the vehicle 1) includes an engine 2 and a motor 3, which serve as power sources for vehicle wheels. The vehicle 1 operates in a mode using only the engine 2 to drive the wheels, a mode using the motor 3 while generating electric power with the engine 2 to drive the wheels, a mode using both the engine 2 and the motor 3 to drive the wheels, and a mode using only the motor 3 to drive the wheels.

The vehicle 1 includes a battery unit 4 that supplies the motor 3 with power. The battery unit 4 includes a battery ECU 5, which manages operations of the battery unit 4, and a battery 6, which includes a plurality of battery cells. The battery unit 4 is a single unit, or battery pack, and incorporates the battery ECU 5 and the battery cells (battery 6) in a housing. The motor 3 is connected by a wire to the battery 6 and produces rotation when powered by the battery 6.

An electronic key system 8, which performs key verification with an electronic key 7 through wireless communication, is installed in the vehicle 1. The electronic key system 8 is, for example, a key-operation-free system. In a key-operation-free system, the vehicle 1 transmits an inquiry (request signal Srq) to the electronic key 7. In response, the electronic key 7 returns an ID code (ID signal Sid) to the vehicle 1. The vehicle 1 then performs ID verification using the ID code. The electronic key system 8 may also be a wireless key system that remotely controls in-vehicle devices by the operation of buttons on the electronic key 7.

The vehicle 1 includes a key verification device 9, a door lock device 10, and an engine starting device 11, which are connected to one another by an in-vehicle bus 12. The key verification device 9 performs ID verification with the electronic key 7. The door lock device 10 manages door lock operations. The engine starting device 11 manages operations of the engine 2. The key verification device 9 includes a verification electronic control unit (ECU) 13, which controls the key verification device 9. The verification ECU 13 includes a memory (not shown), which registers an ID code of the electronic key 7 that corresponds to the vehicle 1.

The verification ECU 13 is connected to an exterior transmitter 14, an interior transmitter 15, and a vehicle tuner 16. The exterior transmitter 14 transmits a low frequency (LF) radio wave outside the vehicle 1. The interior transmitter 15 transmits an LF radio wave inside the vehicle 1. The vehicle tuner 16 receives an ultrahigh frequency (UHF) radio wave. The exterior transmitter 14 and the interior transmitter 15 transmit a request signal Srq, which is an ID return request, on an LF radio wave to attempt smart communication.

The verification ECU 13 receives an ID signal Sid from the electronic key 7 in response to the request signal Srq and performs ID verification, or smart verification. When smart verification with the electronic key 7 outside the vehicle 1, namely, exterior verification, is accomplished, the verification ECU 13 permits or performs locking and unlocking of the doors with the door lock device 10. When smart verification with the electronic key 7 inside the vehicle 1, namely, interior verification, is accomplished, the verification ECU 13 permits the starting of the engine and power activation when an engine switch 17 is pushed.

The electronic key 7 includes a lock button 18 and an unlock button 19, which are operated to remotely lock and unlock the doors. When the lock button 18 or unlock button 19 is operated, the electronic key 7 transmits a corresponding wireless signal Swl. The vehicle 1 receives the wireless signal Swl and performs ID verification with an ID code that is included in the wireless signal Swl. When ID verification is accomplished, the vehicle 1 performs an operation that is in accordance with the content of the wireless signal Swl.

Figure 2:
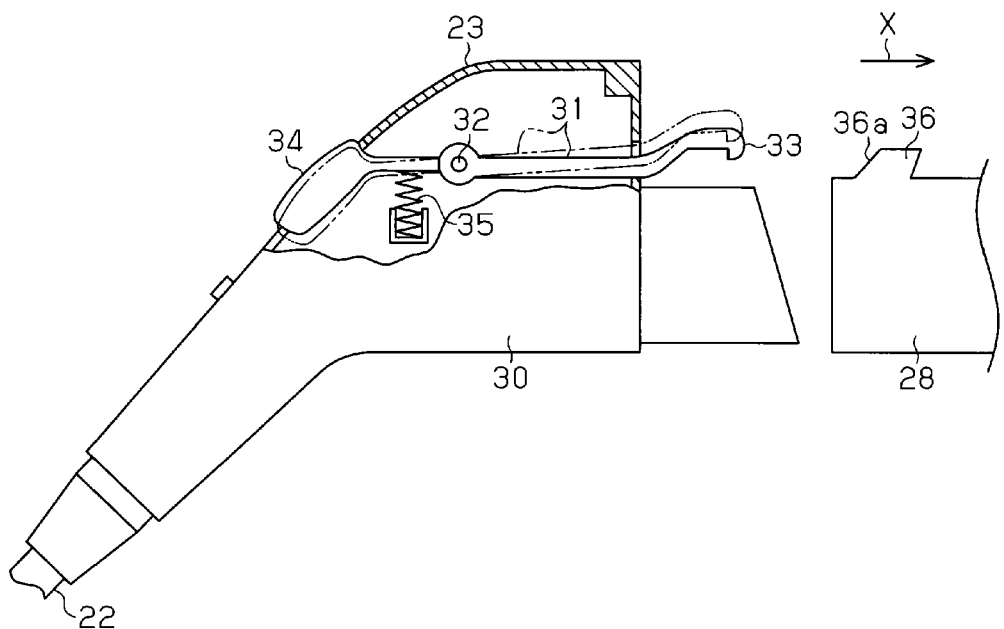
FIG. 2 is a side view, partly in cross-section, showing the power feeding plug prior to connection to an inlet.
Figure 3:
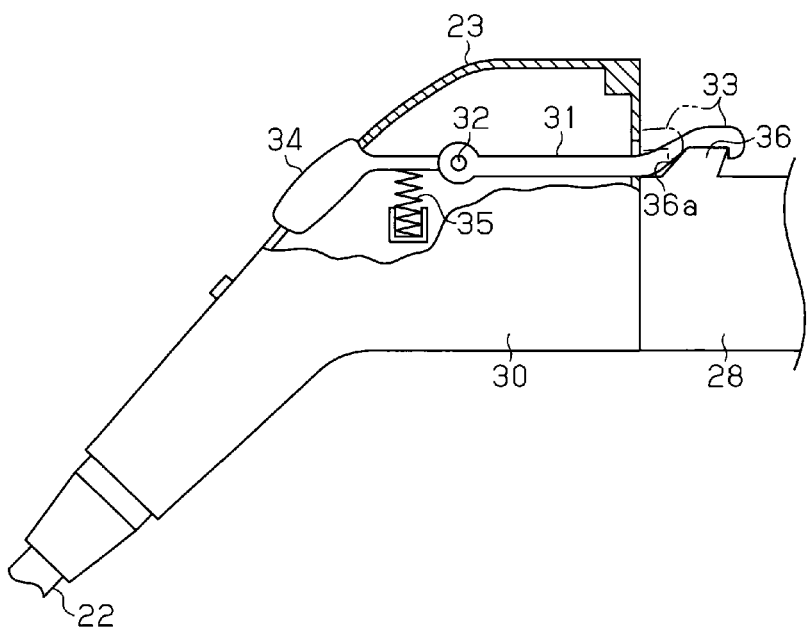
FIG. 3 is a side view, partly in cross-section, showing the power feeding plug connected to the inlet.
Figure 4:
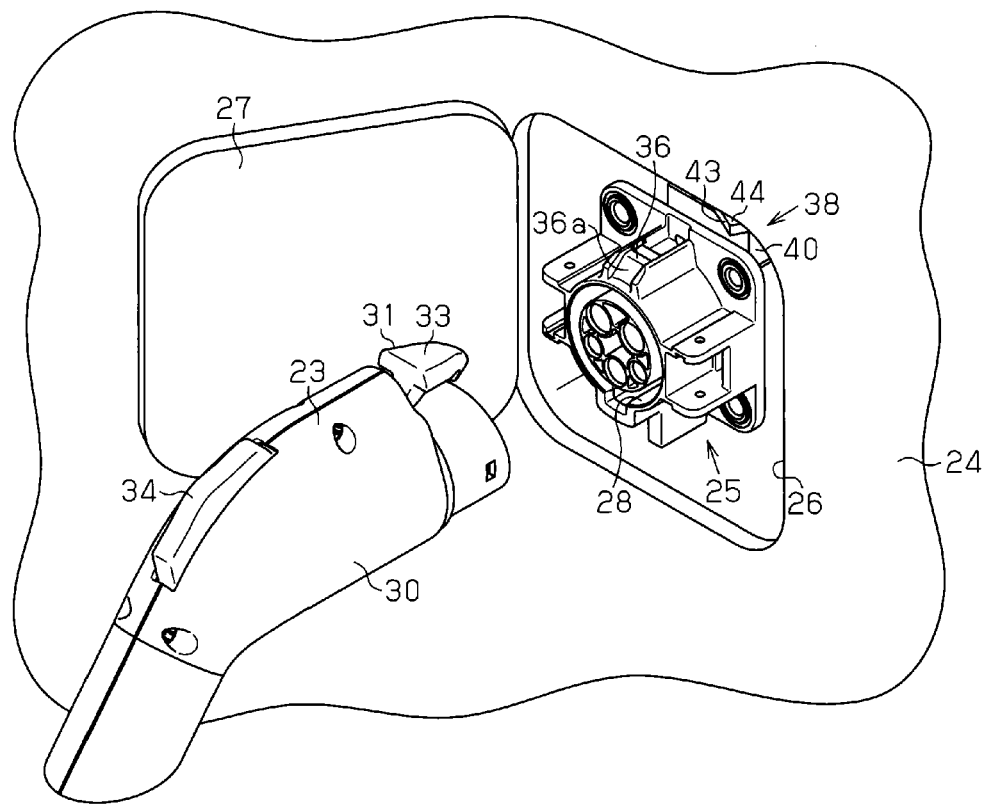
FIG. 4 is a perspective view showing a power receiving connector including the inlet.

The vehicle 1 further includes a charging system 20 that charges the battery 6. The battery 6 may be charged at a charging facility 21, which may be a local charging station or a household outlet of a commercial power supply. A charging cable 22, which is arranged in the charging facility 21, is connected to the vehicle 1 to charge the battery 6. As shown in FIGS. 2 to 4, the charging cable 22 includes a distal end to which a power feeding plug 23 is coupled. The power feeding plug 23 is a power supply side component of the charging system and has the shape of a nozzle.

Referring to FIGS. 1 to 4, the power feeding plug 23 is connected to a power receiving connector 25, which is arranged, for example, in a left front wall of a vehicle body 24 (refer to FIG. 4). The power receiving connector 25 includes an accommodation compartment 26 (refer to FIG. 4), which is closed by a lid 27. An inlet 28 is arranged in the power receiving connector 25. Electrical terminals of the power feeding plug 23 are connected to the inlet 28. As shown in FIG. 1, the inlet 28 includes a plug connection detection sensor 29, which detects complete insertion of the power feeding plug 23.

As shown in FIGS. 2 to 4, the power feeding plug 23 includes a plug body 30. A lock arm 31 is pivotally coupled to the plug body 30 to prevent removal of the power feeding plug 23 from the inlet 28. The lock arm 31 includes a shaft 32, which extends perpendicular to an insertion direction (X axis direction as shown in FIG. 2) of the power feeding plug 23. Further, the lock arm 31 includes a distal end, which forms a hook 33, and a basal end, which forms an operation portion 34. The hook 33 and the operation portion 34 are exposed from the plug body 30. An urging member 35, which urges the lock arm 31 toward a close position, is coupled to the lock arm 31.

When connecting the power feeding plug 23 to the power receiving connector 25, the power feeding plug 23 is inserted straight into the power receiving connector 25. As shown by the broken lines in FIG. 3, the lock arm 31 is forced against an inclined surface 36a of a projection 36, which projects from an upper wall of the inlet 28. This moves the hook 33 along the inclined surface 36a. That is, the lock arm 31 is pivoted toward an open position. Then, as shown by the solid lines in FIG. 3, when the hook 33 moves beyond the inclined surface 36a and the power feeding plug 23 is completely inserted into the inlet 28, the urging force of the urging member 35 pivots the lock arm 31 downward toward the close position. This engages the hook 33 with the projection 36 and prevents removal of the power feeding plug 23 from the inlet 28.

When the battery ECU 5 determines with the plug connection detection sensor 29 that the power feeding plug 23 has been completely inserted into the inlet 28, the battery ECU 5 sends an inquiry to the verification ECU 13 on the ID verification result. When ID verification has not been accomplished, the verification ECU 13 retries smart verification. When ID verification has been accomplished, the battery ECU 5 permits the flow of current from the power feeding plug 23 to the battery 6 by activating a switch (not shown) arranged in a current path of the battery 6. The battery 6 is charged when current flows to the battery 6 from the power feeding plug 23 via the inlet 28 and power lines 37.

After charging is completed, to remove the power feeding plug 23 from the inlet 28, the operation portion 34 of the lock arm 31 is pressed down to pivot the lock arm 31 toward the open position. This disengages the hook 33 from the projection 36. In this state, the power feeding plug 23 is removed from the inlet 28 by pulling the power feeding plug 23.

As shown in FIG. 1, the power receiving connector 25 includes a locking device 38 that prevents unauthorized removal of the power feeding plug 23 from the inlet 28. In the present embodiment, as shown in FIGS. 5 to 10, the locking device 38 includes a lock mechanism 39 (electric lock mechanism), which serves as a mechanism unit of the locking device 38 and which is arranged above the inlet 28. The lock mechanism 39 includes a case 40, which accommodates various components of the lock mechanism 39. The case 40 is formed by coupling an upper housing 41 and a lower housing 42 to each other.

Figure 5:
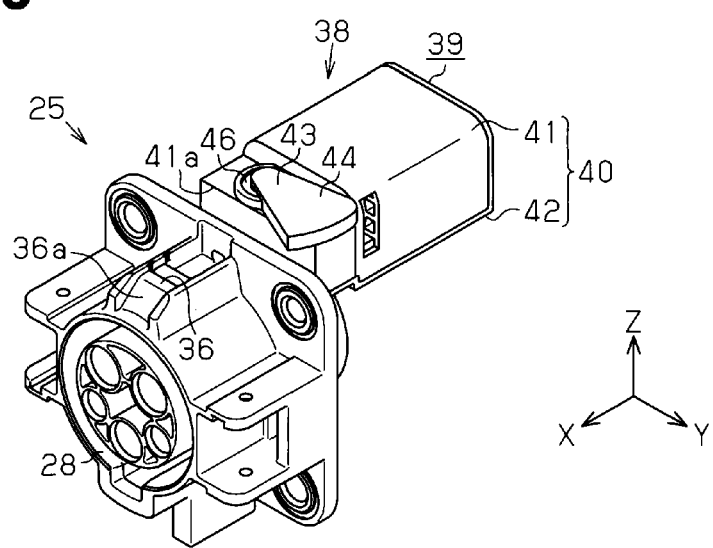
FIG. 5 is a perspective view showing a lock mechanism and the inlet.

As shown in FIGS. 5 to 12, a lock bar 43, which serves as a lock member, is coupled to the case 40 and is pivotal along a plane (XY plane as viewed in FIG. 5). The lock bar 43 is used to restrict movement of the lock arm 31 to the open position. The lock bar 43 includes a planar surface parallel to the XY plane. For example, the lock bar 43 includes a generally triangular restriction plate 44, which contacts the lock arm 31. The restriction plate 44 may also be generally tetragonal. As shown in FIGS. 6 to 10, a shaft 45 is formed near one end, namely, the peak, of the restriction plate 44. The shaft 45 extends from a lower surface of the restriction plate 44 in a heightwise direction (Z axis direction as viewed in FIG. 6). The lock bar 43 is pivoted about the shaft 45. The upper housing 41 includes an upper edge surface 41a (refer to FIG. 6). When the lock bar 43 is pivoted about the shaft 45, the lock bar 43 moves outward from the upper edge surface 41a of the upper housing 41. The shaft 45 has a distal end supported by a shaft seat 42a, which is formed on an inner surface of the lower housing 42.

As shown in FIGS. 6 to 12, a seal 46 is arranged on a basal end of the shaft 45. The seal 46 is formed by, for example, an O-ring. An insertion hole 47, into which the shaft 45 of the lock bar 43 is inserted, extends through an upper wall of the upper housing 41. The seal 46 is fitted into a seal groove 48, which is formed around the periphery of the insertion hole 47. An annular flange extends around the seal groove 48. The seal groove 48 corresponds to a location to which the lock bar 43 is coupled. The seal 46 prevents fluid from entering the lock mechanism 39 at the seal groove 48 to which the lock bar 43 is coupled.

As shown in FIGS. 6 to 10, the case 40 accommodates a motor 49, which serves as a drive source of the lock mechanism 39. The motor 49 is supported by a bracket 50. The motor 49 includes a motor shaft 49a, which is perpendicular to the shaft 45 of the lock bar 43. That is, the motor shaft 49a extends laterally. The motor 49 corresponds to an actuator.

As shown in FIGS. 6 to 12, the motor 49 is coupled by a worm gear mechanism 51 to the lock bar 43. In the present embodiment, the worm gear mechanism 51 includes a worm gear 52, which is coupled to the motor shaft 49a. An annular worm wheel 53, which is engaged with the worm gear 52, is coupled to the shaft 45 of the lock bar 43. The worm wheel 53 includes an outer surface, part of which forms a gear section 54 that engages with the worm gear 52. The worm gear mechanism 51 and the worm wheel 53 form a conversion member.

Figure 13:
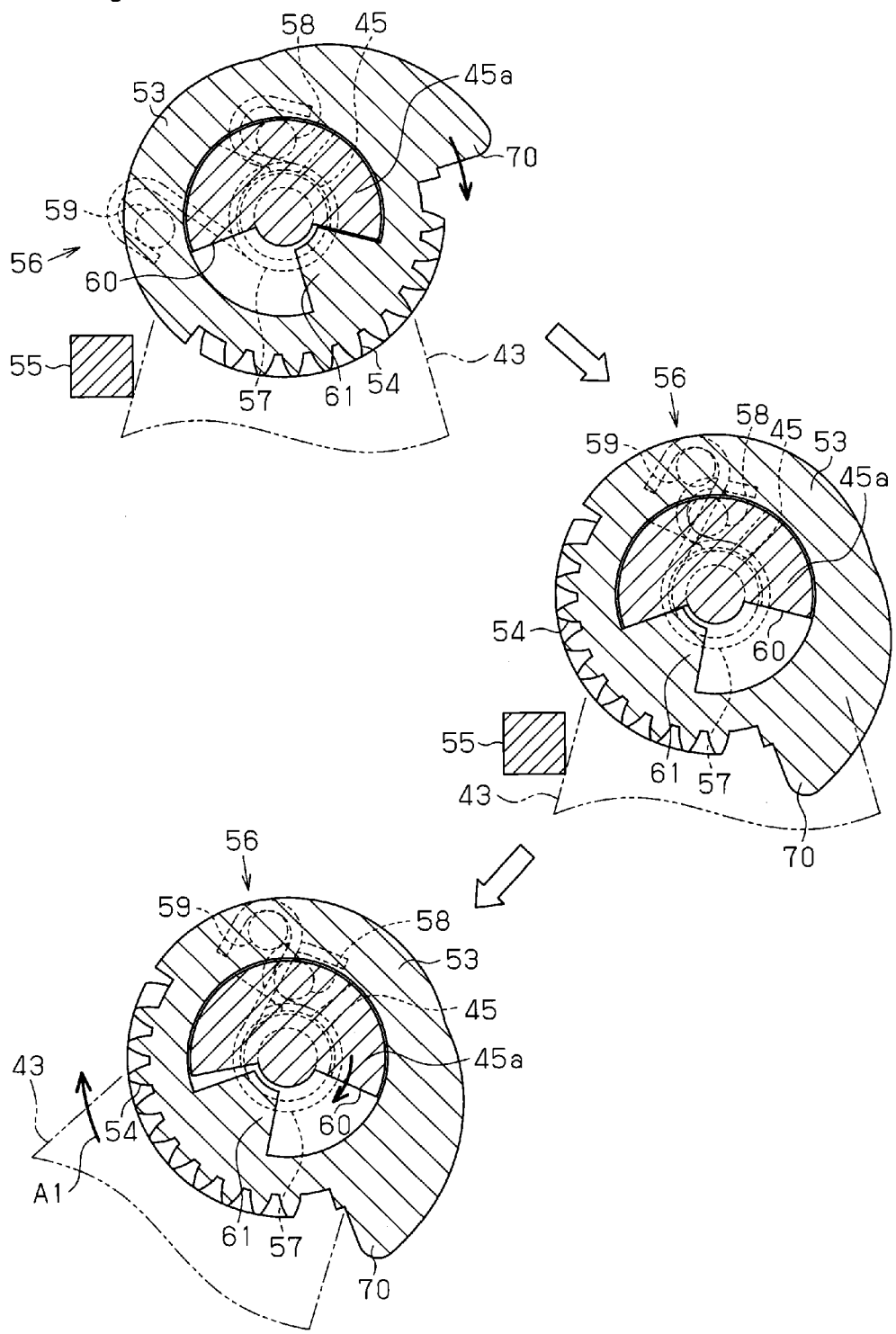
FIG. 13 is a diagram illustrating the movement of an absorption mechanism.

Referring to FIG. 13, an absorption mechanism 56 couples the lock bar 43 and the worm wheel 53. The absorption mechanism 56 permits rotation of the worm wheel 53 even when an obstacle 55 interferes with and stops the lock bar 43 during movement of the lock bar 43 to a lock position. For example, when the lock arm 31 is not completely engaged with the projection 36, namely, in a semi-engaged state, the hook 33 of the lock arm 31 may become the obstacle 55. In this case, even when the lock bar 43 comes into contact with the lock arm 31, the absorption mechanism 56 allows the worm wheel 53 to continue rotation. Then, when the lock arm 31 is completely engaged with the projection of the hook 33, the absorption mechanism 56 functions to pivot the lock bar 43 to the lock position.

The absorption mechanism 56 includes a spring 57 formed, for example, by a torsion spring. The spring 57 integrally couples the lock bar 43 and the worm wheel 53. The spring 57 includes a main body, through which the shaft 45 of the lock bar 43 is inserted, a first end, which is hooked to a hooking rod 58 (engagement piece) formed on the lock bar 43, and a second end, which is hooked to a hooking rod 59 (engagement piece) formed on the worm wheel 53. The basal end of the lock bar 43 forms a large diameter portion 45a. Part of the large diameter portion 45a is cut away to form a cutaway groove 60 that defines a play clearance. The cutaway groove 60 is, for example, generally triangular. An engagement projection 61, which projects from an inner surface of the worm wheel 53, is received in the cutaway groove 60.

The lock bar 43, the seal 46, the worm wheel 53, and the spring 57 are arranged to be co-axial with one another. Thus, the shaft 45 and the hooking rods 58 and 59 extend parallel to one another. In the first embodiment, the spring 57, the hooking rods 58 and 59, and the cutaway groove 60 form a coupling member. The absorption mechanism 56 is formed by this coupling member and the conversion member mentioned above.

A hooking plate 62 is coupled to the shaft 45 to position the worm wheel 53, which is coupled to the shaft 45. The hooking plate 62 has the shape of part of a ring and is hooked to a hooking groove 63 formed in the shaft 45.

FIG. 11 shows the lock mechanism 39 in an unlock state. In this state, when the motor 49 generates drive force that produces rotation in one direction (forward rotation), the motor 49 rotates the worm wheel 53 and the lock bar 43 in one direction (clockwise direction A1 as viewed in FIG. 11). Then, referring to FIG. 12, when the lock bar 43 blocks the hook 33 of the lock arm 31 from above, the lock mechanism 39 shifts to a lock state. In the lock state, when the motor 49 generates drive force that produces rotation in the other direction (reverse rotation), the motor 49 rotates the worm wheel 53 and the lock bar 43 in the other direction (counterclockwise direction A2 as viewed in FIG. 12). As the lock bar 43 moves away from the hook 33, the lock mechanism 39 shifts to the unlock state shown in FIG. 11.

Figure 11A:
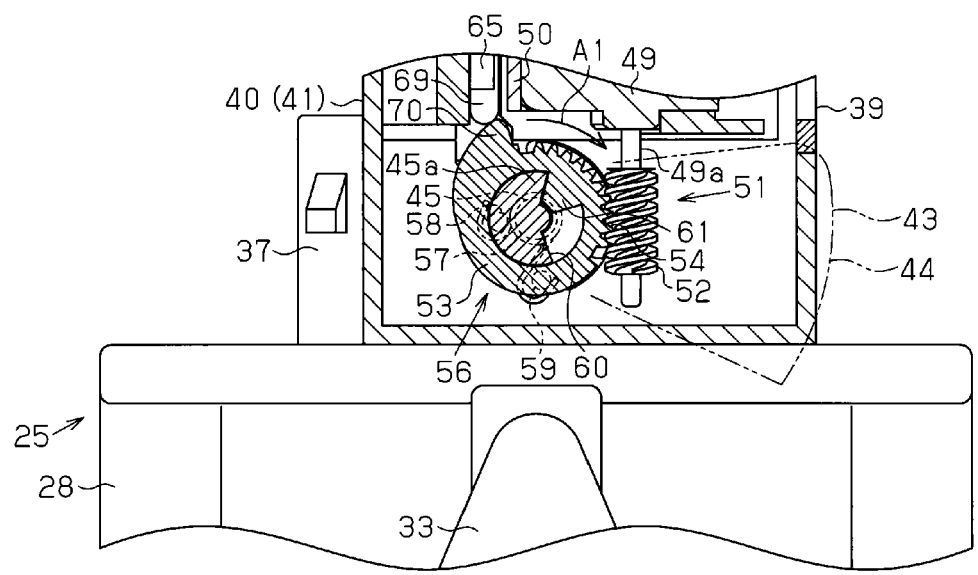
FIG. 11A is a cross-sectional plan view showing the lock mechanism in an unlock state.
Figure 11B:
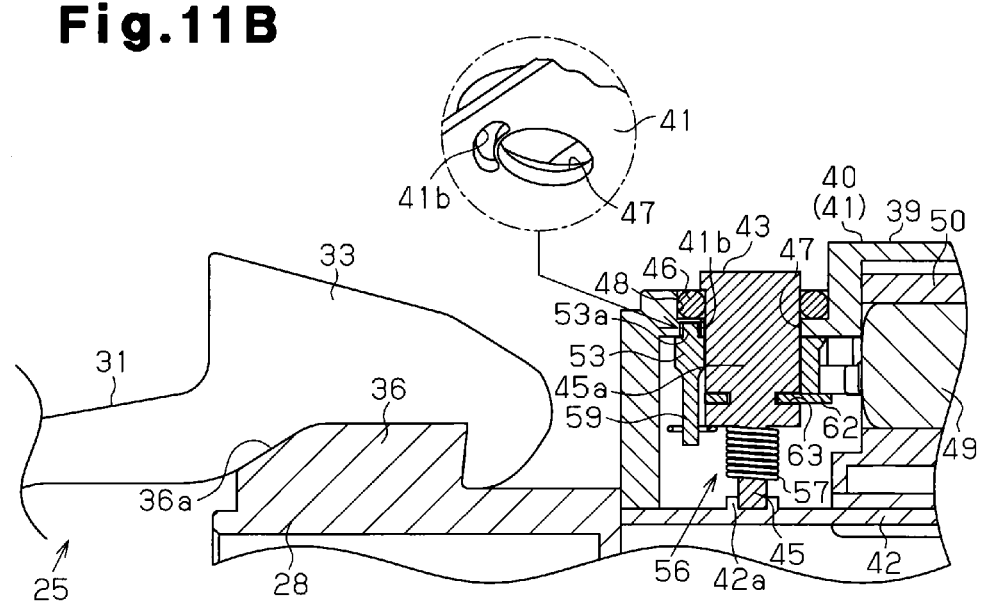
FIG. 11B is a cross-sectional side view showing the lock mechanism in the unlock state.

As shown in the portion encircled by a broken line in FIG. 11B, a guide groove 41b is formed in the inner surface of the upper housing 41 to determine a pivot amount of the lock bar 43. The guide groove 41b forms an arcuate passage. A guide projection 53a, which projects from an upper surface of the worm wheel 53 is received in the guide groove 41b. When the lock bar 43 is pivoted to an extreme point such as the lock position or the unlock position, the guide projection 53a contacts an end of the guide groove 41b. This restricts further pivoting of the lock bar 43.

Figure 6:
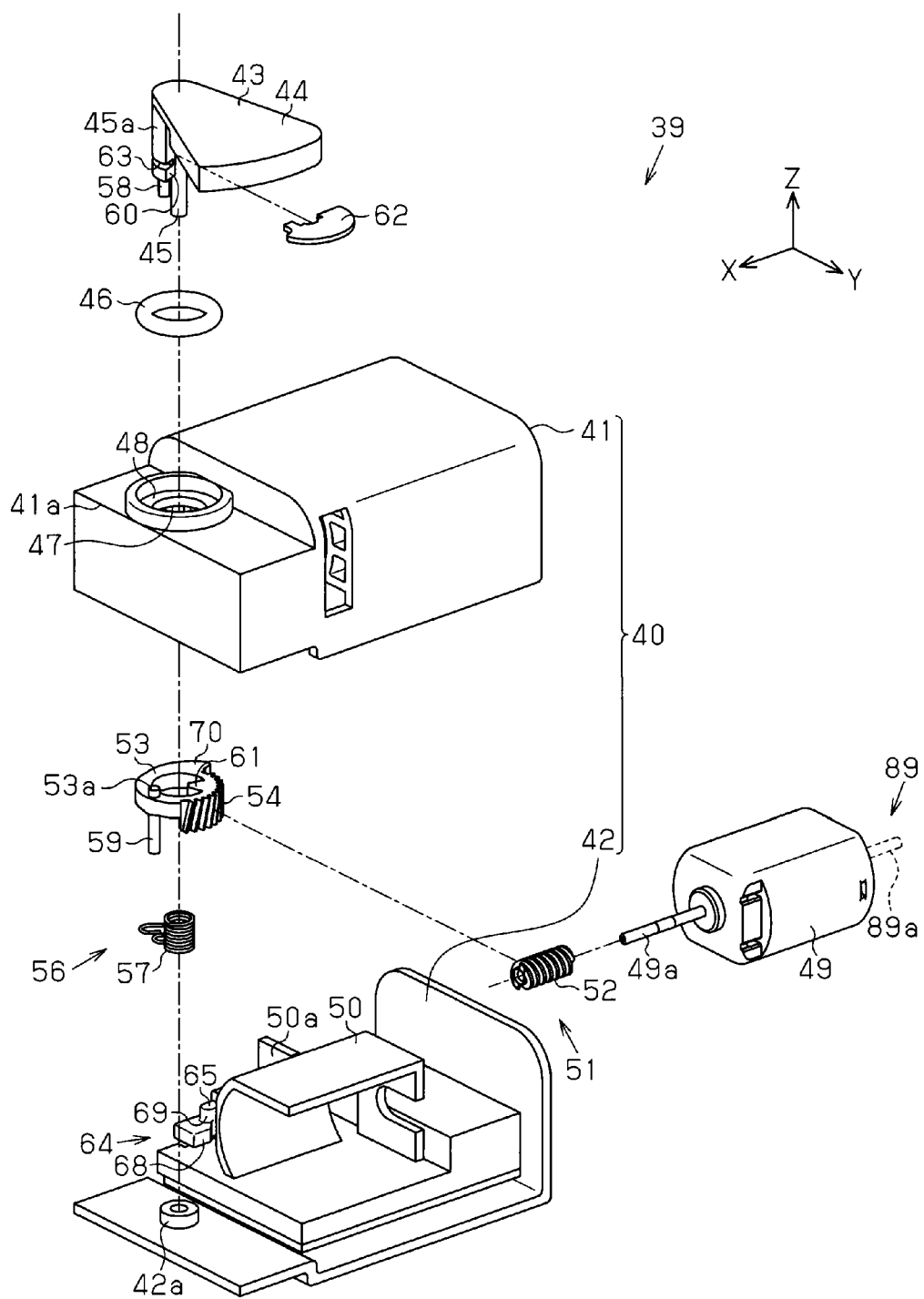
FIG. 6 is an exploded perspective view showing the structure of the lock mechanism.
Figure 7:
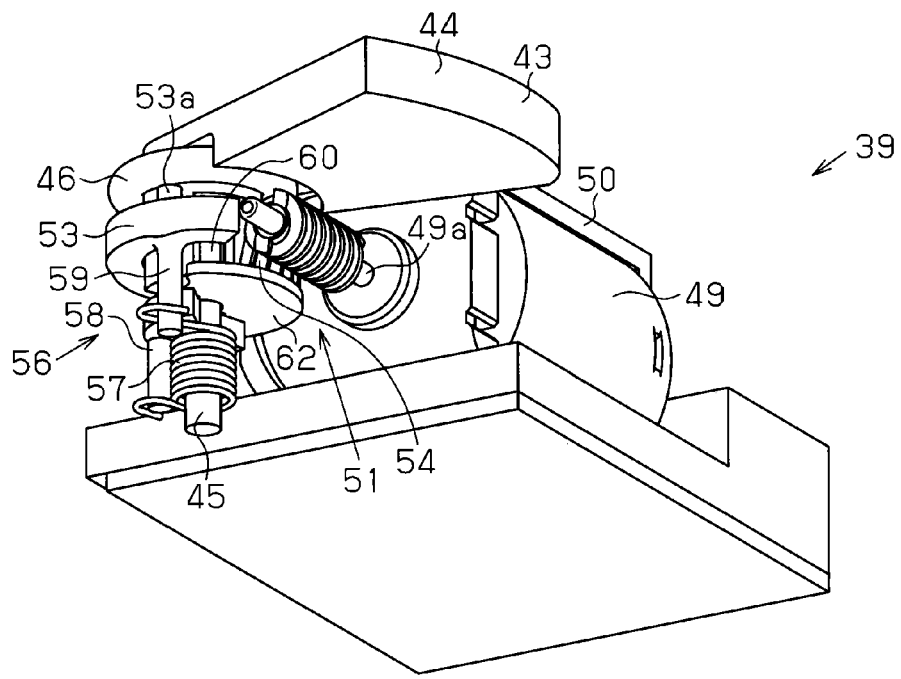
FIG. 7 is a perspective view showing the lock mechanism from a lower right side.
Figure 8:
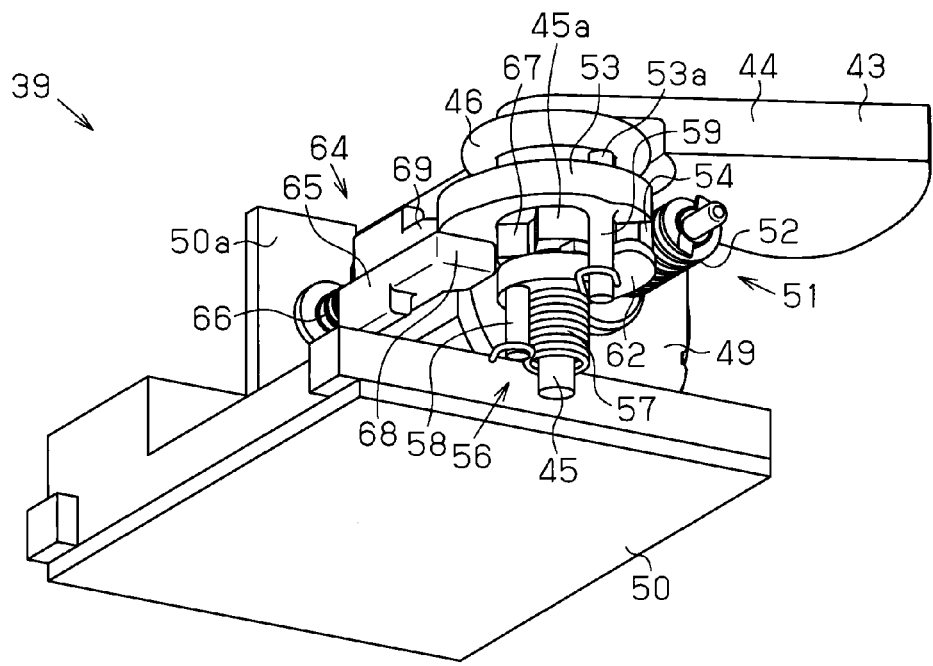
FIG. 8 is a perspective view showing the lock mechanism from a lower left side.
Figure 9:
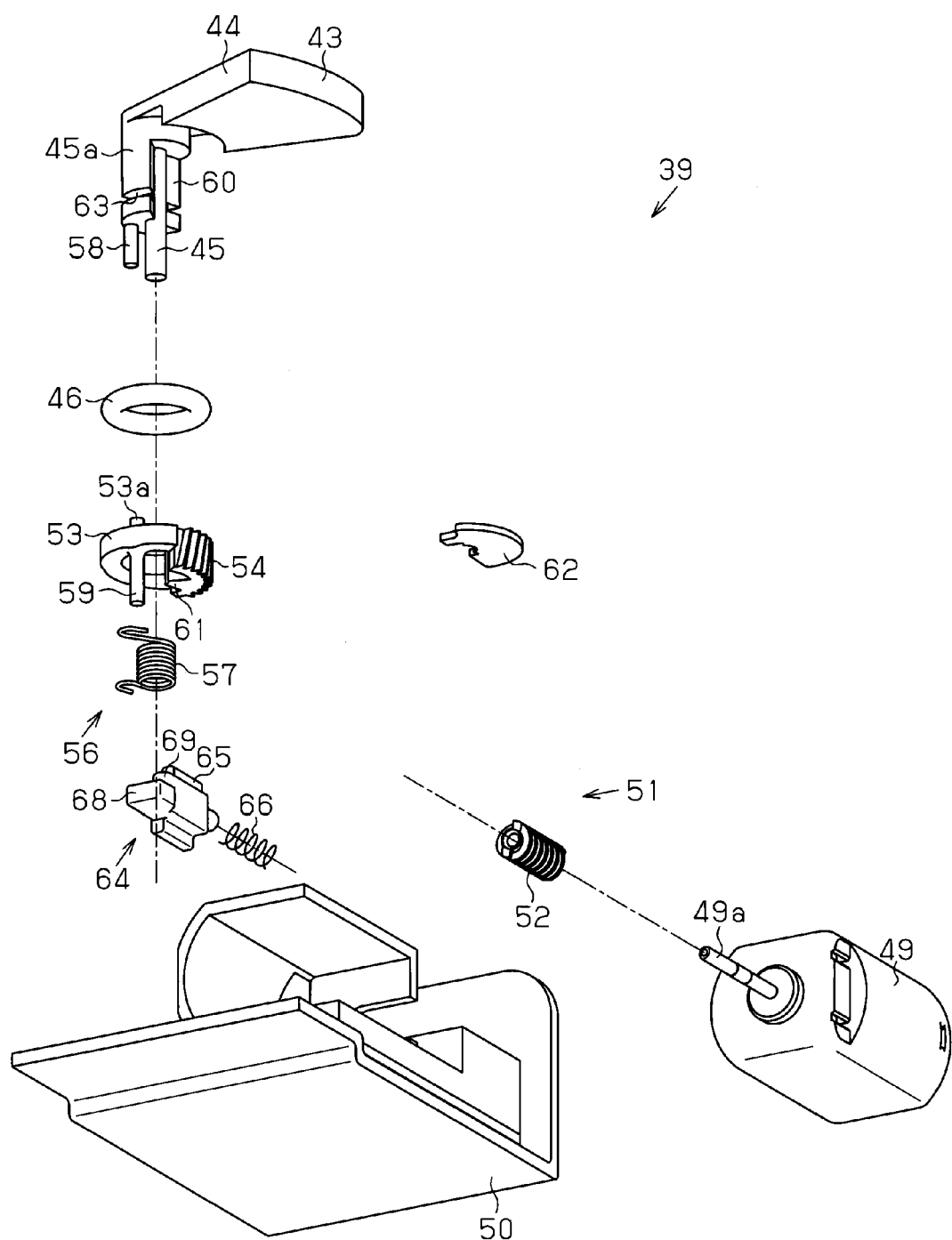
FIG. 9 is an exploded perspective view showing the structure of the lock mechanism from a lower right side.
Figure 10:
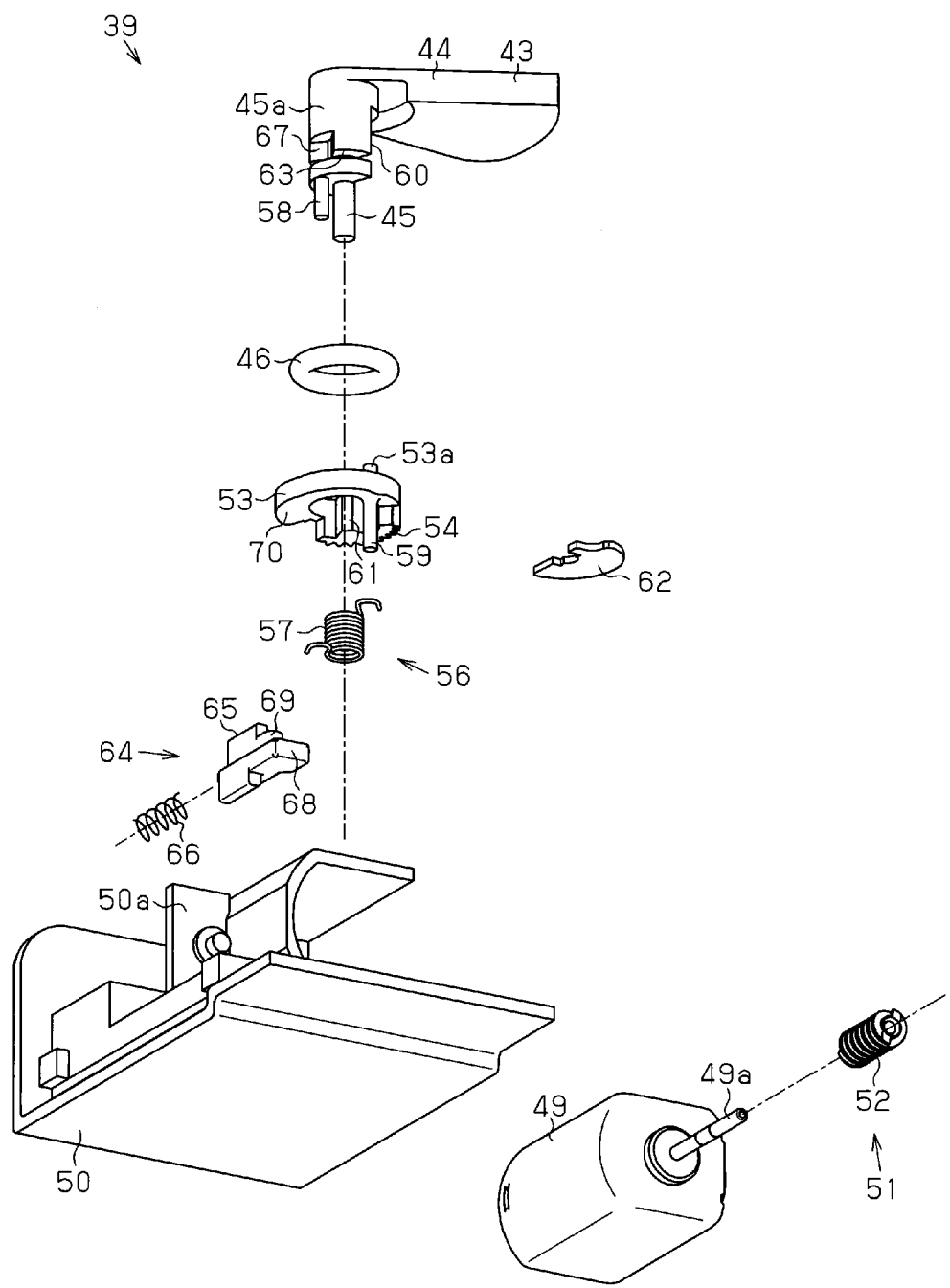
FIG. 10 is an exploded perspective view showing the structure of the lock mechanism from a lower left side.

Referring to FIGS. 6, 8, and 10, the lock mechanism 39 includes a deadlock mechanism 64, which fixes, or deadlocks, the lock bar 43 when the lock mechanism 39 is in a lock state. For example, when the lock bar 43 is located at the lock position, the deadlock mechanism 64 stops pivoting of the lock bar 43 and thereby prevents the lock mechanism 39 from shifting to the unlock state in an unauthorized manner.

The deadlock mechanism 64 includes a rod-shaped deadlock pin 65, which is engageable with the lock bar 43. The deadlock pin 65 is accommodated in the case 40 and supported to be movable back and forth in a direction parallel to the motor shaft 49a. As shown in FIG. 8, the case 40 includes a wall 50a, which faces toward a rear surface of the deadlock pin 65. An urging member 66 is arranged between the wall 50a of the case 40 and the deadlock pin 65. The urging member 66 urges the deadlock pin 65 toward the lock bar 43. Further, a hooking groove 67, which receives the deadlock pin 65, is formed in the shaft 45 of the lock bar 43. The deadlock pin 65 corresponds to a deadlock member.

Figure 14:
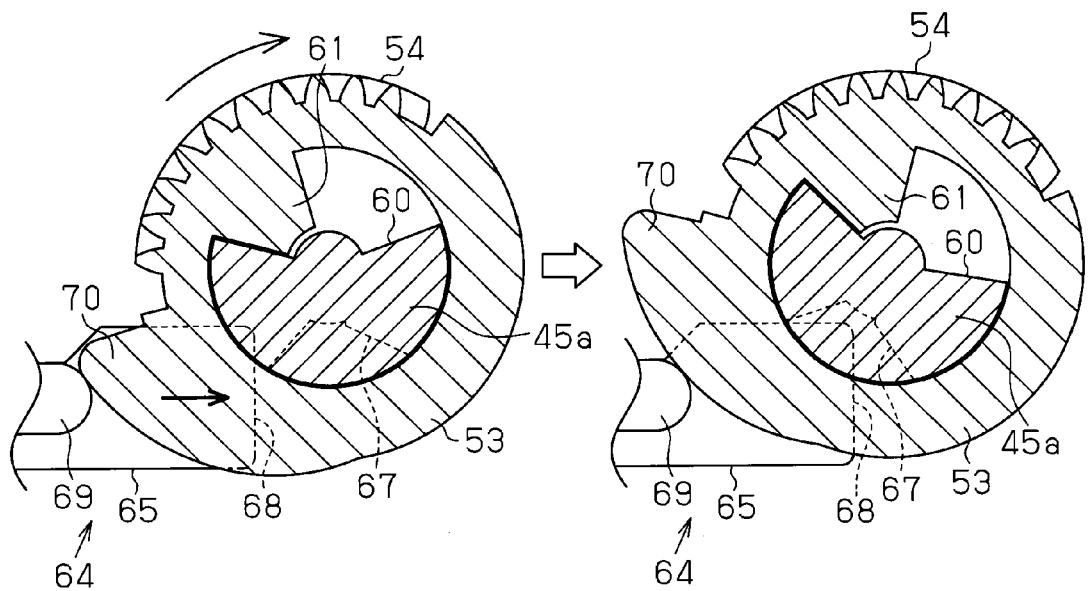
FIG. 14 is a diagram illustrating the movement of a deadlock mechanism.

Referring to FIG. 14, when the lock bar 43 is pivoted to the lock position, the deadlock pin 65 faces toward the hooking groove 67. In this state, the urging force of the urging member 66 moves the deadlock pin 65 outward, and a hooking portion 68 formed at the distal end of the deadlock pin 65 enters the hooking groove 67. As a result, the deadlock mechanism 64 shifts the lock bar 43 to a deadlock state. This stops movement of the lock bar 43 and thereby prohibits unauthorized unlocking of the lock mechanism 39.

A guide wall 69 extends from the upper surface of the deadlock pin 65. The guide wall 69 functions to release the deadlock mechanism 64 and includes a semicircular distal end. A guide 70 projects from the peripheral surface of the worm wheel 53 to release the deadlock mechanism 64 in cooperation with the guide wall 69. The guide 70 is projected from the peripheral surface of the worm wheel 53 by a width that gradually decreases from a distal end of the guide 70 (left end as viewed in FIG. 14) to a basal end of the guide 70 (right end as viewed in FIG. 14).

Figure 15:
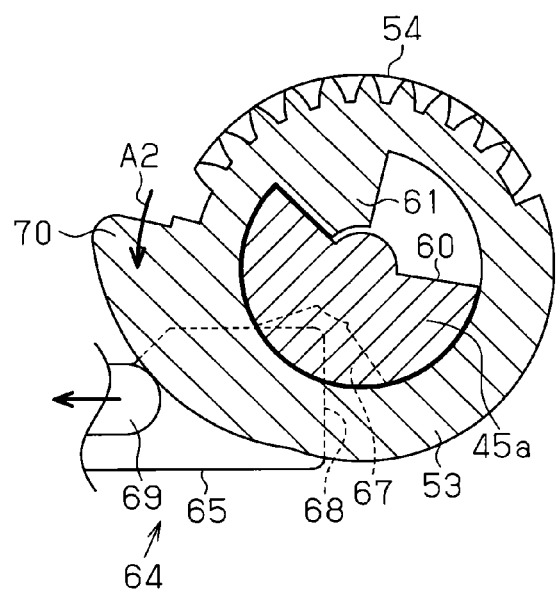
FIG. 15 is a diagram illustrating the movement of the deadlock mechanism.

Referring to FIG. 15, when the deadlock mechanism 64 is in a lock state, as the motor 49 produces reverse rotation that rotates the worm wheel 53 in the A3 direction, the guide 70 pushes the guide wall 69. As a result, the deadlock pin 65 moves away from the lock bar 43 against the urging force of the urging member 66. That is, the deadlock pin 65 moves out of the hooking groove 67. This releases the lock bar 43 from the deadlock state, which is produced by the deadlock mechanism 64.

As shown in FIG. 1, the power receiving connector 25 includes a lock ECU 71, which controls the locking device 38. The lock ECU 71 is connected to the in-vehicle bus 12 and exchanges information with other ECUs and devices. Further, the lock ECU 71 is connected to the motor 49 of the lock mechanism 39.

When the lock mechanism 39 is in an unlock state, the lock ECU 71 produces forward rotation with the motor 49 to shift the lock mechanism 39 to a lock state under the condition that a predetermined lock condition is satisfied. For example, the lock condition may be a lock switch (not shown) arranged on the power receiving connector 25 being operated, the doors of the vehicle 1 being locked, or both of these conditions being satisfied. When the lock mechanism 39 is in a lock state, the lock ECU 71 produces reverse rotation with the motor 49 to shift the lock mechanism 39 to an unlock state under the condition that a predetermined unlock condition is satisfied. For example, the lock condition may be an unlock switch (not shown) arranged on the power receiving connector 25 being operated in a state in which ID verification of the electronic key 7 has been accomplished, the doors of the vehicle 1 being unlocked, or both of these conditions being satisfied.

The operation of the locking device 38 will now be described with reference to FIGS. 11 to 15.

As shown in FIG. 11, when the locking device 38 is in an unlock state, the lock bar 43 is located at an open position in which the restriction plate 44 is separated from the projection 36. That is, when the power feeding plug 23 is connected to the power receiving connector 25, the lock bar 43 is located at a position in which there is no contact with the hook 33 of the lock arm 31. This allows for the power feeding plug 23 to be connected to the power receiving connector 25.

To shift the lock mechanism 39 to the lock state after connecting the power feeding plug 23 to the power receiving connector 25, the lock switch (not shown) of the power receiving connector 25 is operated or the doors of the vehicle 1 are locked to satisfy the required lock condition as mentioned above. When the lock ECU 71 determines that the lock condition has been satisfied, the lock ECU 71 produces forward rotation with the motor 49 to shift the lock mechanism 39 from the unlock state to the lock state.

As the motor 49 produces forward rotation, rotation force is transmitted from the motor 49 via the worm gear 52 to the worm wheel 53. Thus, the worm wheel 53 is rotated in the direction of arrow A1 as shown in FIG. 11A about the shaft 45 of the lock bar 43. The spring 57 couples the worm wheel 53 to the lock bar 43. Thus, when the worm wheel 53 rotates in the direction of arrow A1, the lock bar 43 synchronously rotates in the same direction.

Figure 12A:
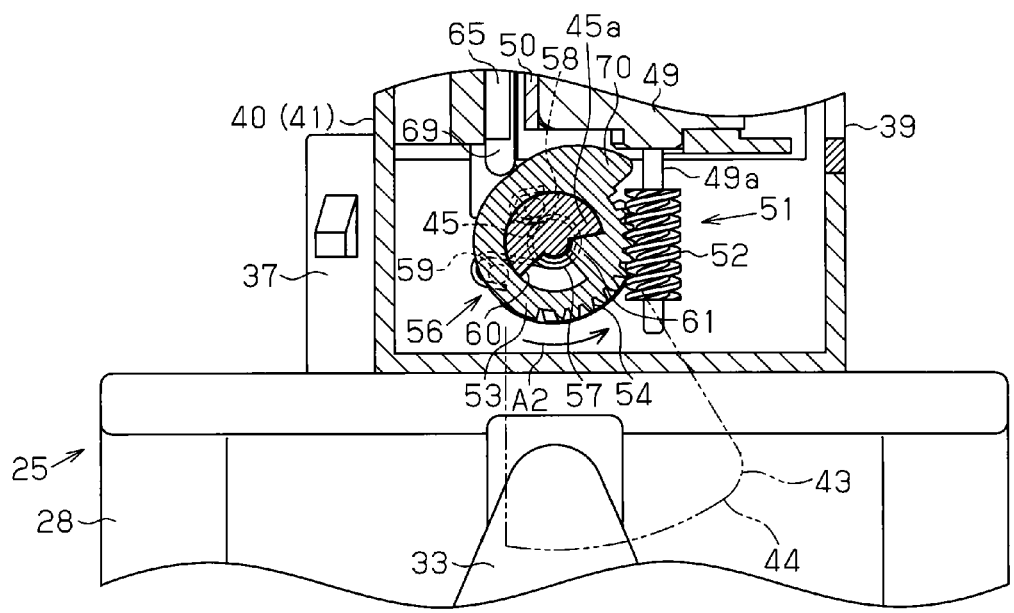
FIG. 12A is a cross-sectional plan view showing the lock mechanism in a lock state.
Figure 12B:
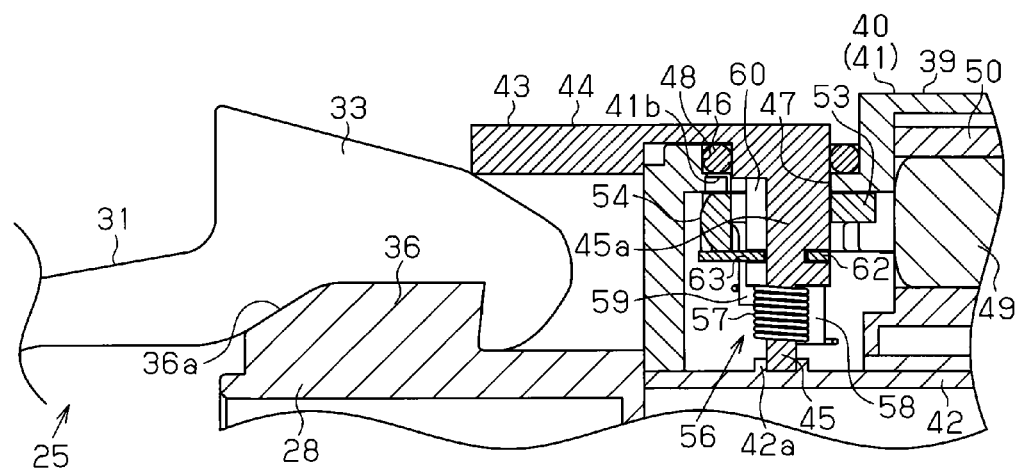
FIG. 12B is a cross-sectional side view showing the lock mechanism in the lock state.

When the motor 49 produces a certain amount of rotation, as shown in FIG. 12, the lock mechanism 39 shifts to the lock state in which the restriction plate 44 of the lock bar 43 is projected outward from the upper housing 41. In this state, the restriction plate 44 is located above the hook 33 of the lock arm 31 and holds the lock arm 31 from above. This prohibits movement of the lock arm 31 to the open position and prevents removal of the power feeding plug 23 from the power receiving connector 25.

When the lock mechanism 39 is in the lock state, as shown in FIG. 14 (right drawing), the guide 70 of the worm wheel 53 stops pressing the guide wall 69 of the deadlock pin 65. Thus, the urging force of the urging member 66 moves the deadlock pin 65 into the hooking groove 67 of the shaft 45 (lock bar 43). Here, the deadlock mechanism 64 holds the lock bar 43 in the deadlock state. This prohibits pivoting of the lock bar 43. In this state, when someone attempts to forcibly pivot the lock bar 43 through a gap or the like formed in the power receiving connector 25, the deadlock mechanism 64 acts to restrict pivoting of the lock mechanism. This prevents unauthorized shifting of the lock mechanism 39 from the lock state to the unlock state.

Then, to shift the lock mechanism 39 to the unlock state, the lock switch (not shown) of the power receiving connector 25 is operated in a state in which ID verification of the electronic key 7 has been accomplished or the doors of the vehicle 1 are unlocked to satisfy the required unlock condition as mentioned above. When the lock ECU 71 determines that the lock condition has been satisfied, the lock ECU 71 produces reverse rotation with the motor 49 to shift the lock mechanism 39 from the unlock state to the lock state.

As the motor 49 produces reverse rotation, rotation force is transmitted from the motor 49 via the worm gear 52 to the worm wheel 53. Thus, the lock bar 43 starts to rotate together with the worm wheel 53 in the direction of arrow A2 as shown in FIG. 12A about the shaft 45 of the lock bar 43. Referring to FIG. 15, as the worm wheel 53 rotates, the guide 70 of the worm wheel 53 presses the guide wall 69 of the deadlock pin 65 and separates the deadlock pin 65 from the hooking groove 67. Thus, the deadlock mechanism 64 releases the lock bar 43 from the deadlock state. This permits pivoting of the lock bar 43 to the unlock position.

When the motor 49 produces a certain amount of rotation, as shown in FIG. 11, the lock mechanism 39 shifts to the unlock state in which the restriction plate 44 of the lock bar 43 is separated from the hook 33 of the lock arm 31. This permits removal of the power feeding plug 23 from the power receiving connector 25.

When the lock mechanism 39 shifts to the lock state under a situation in which the lock arm 31 is semi-engaged with the hook 33, the lock arm 31 interferes with the pivoting of the lock bar 43. That is, as shown in FIG. 13, the lock bar 43 comes into contact with the lock arm 31, which becomes an obstacle 55, and cannot be pivoted. However, the lock mechanism 39 of the present example includes the absorption mechanism 56, which permits pivoting of the worm wheel 53 (i.e., rotation of the motor 49) while absorbing the rotation force transmitted to the immovable lock bar 43. Thus, even when the lock bar 43 stops, the worm wheel 53 continues to rotate along the cutaway groove 60 formed in the large diameter portion 45a of the shaft 45. That is, the worm gear 52 continues to rotate. As a result, even when the lock bar 43 gets caught in an obstacle 55 (lock arm 31), the drive force of the motor 49 rotates the worm wheel 53.

Then, when the lock arm 31 is moved upward, downward, leftward, and rightward and re-positioned to resolve the semi-engaged state, the urging force of the spring 57 starts to pivot the lock bar 43 in the direction of arrow A1. This pivots the lock bar 43 until the inner wall of the cutaway groove 60 comes into contact with the side wall of the engagement projection 61 in the worm wheel 53. Accordingly, when the lock arm 31 is in a semi-engaged state, the lock mechanism 39 is consequently switched to the lock state.

As described above, in the present example, the lock bar 43 is formed by a generally plate-shaped pivot member. Accordingly, when moving from the lock position to the unlock position or vice-versa, the lock bar 43 pivots at the same location. In other words, the lock bar 43 does not require much space to shift positions. This allows for the lock mechanism 39 and ultimately, the locking device 38, to be reduced in size.

The locking device 38 of the first embodiment has the advantages described below.

(1) The lock bar 43 is formed by a generally plate-shaped pivot member. Accordingly, the lock mechanism 39 does not require a large space to enable movement of the lock bar 43 between the lock position and the unlock position. This allows for the lock mechanism 39 and ultimately, the locking device 38, to be reduced in size.

(2) A seal 46 is arranged between the lock bar 43 and the seal groove 48 to eliminate the gap therebetween. This prevents fluid, such as water, from entering the case 40 through the gap between the lock bar 43 and the seal groove 48. Thus, the waterproof property of the lock mechanism 39 is improved.

(3) If the lock bar 43 were to be of a slide type that linearly moves back and forth between a lock position and an unlock position, the following problem may occur. When the lock bar 43 is retracted into a hermetically sealed accommodation compartment, projection of the lock bar 43 from the accommodation compartment lowers the pressure of the accommodated compartment. Thus, air enters the accommodation compartment through gaps formed between the lock bar 43 and the seal 46 (O-ring). In this state, when moisture or dust is on the lock bar 43 or seal 46, the moisture or dust may enter the accommodation compartment together with the air. Further, the moisture (e.g., vapor water) suspended in the air may have an adverse effect on electronic components. However, such a pressure change does not occur when the lock bar 43 is of a rotational type as in the present example. Thus the amount of water or dust that enters the accommodation compartment is subtle.

(4) The lock mechanism 39 includes the absorption mechanism 56, which permits rotation of the worm gear 52 (worm wheel 53) even when the lock bar 43 is caught by an obstacle 55, such as the lock arm 31. This ensures rotation of the worm gear 52 when drive force is received from the motor 49 regardless of the obstacle 55 obstructing pivoting of the lock bar 43. That is, restrictions are not imposed on the rotation produced by the motor 49. Since excessive load is not applied to the motor 49 and components coupled to the motor 49, the lock mechanism 39 is protected from damages.

(5) The lock mechanism 39 includes the deadlock mechanism 64, which holds the lock mechanism 39 in the lock state. Thus, when the lock mechanism 39 is in the lock state, the deadlock mechanism 64 prohibits pivoting of the lock bar 43 even when someone directly pivots the lock bar 43 to shift the lock mechanism 39 to the unlocked state in an unauthorized manner. This ensures security with respect to unauthorized unlocking of the lock mechanism 39.

(6) The worm gear mechanism 51 pivots the lock bar 43. Thus, the operation load produced when pivoting the lock bar 43 may greatly be increased by the reduction ratio of the worm gear 52. This makes it further difficult to directly rotate the lock bar 43. This improves security with respect to unauthorized unlocking of the lock mechanism 39.

(7) When the lock bar 43 is moved to above the hook 33, the lock bar 43 holds the hook 33 from above. This shifts the lock mechanism 39 to the lock state. Thus, the lock mechanism 39 in the present example simplifies the structure for holding the hook 33 from above with the lock bar 43.

(8) The lock bar 43, the seal 46, the worm wheel 53, and the spring 57 are arranged to be coaxial with one another. These components are thus concentrated at the same location. This further contributes to reduction in size of the lock mechanism 39, and ultimately, the locking device 38.

Second Embodiment

A second embodiment will now be described with reference to FIGS. 16 to 20. The second embodiment differs from the first embodiment in the conversion member. To avoid redundancy, like or same reference numerals are given to those components that are the same as the corresponding components of the first embodiment. Such components will not be described in detail.

Figure 16:
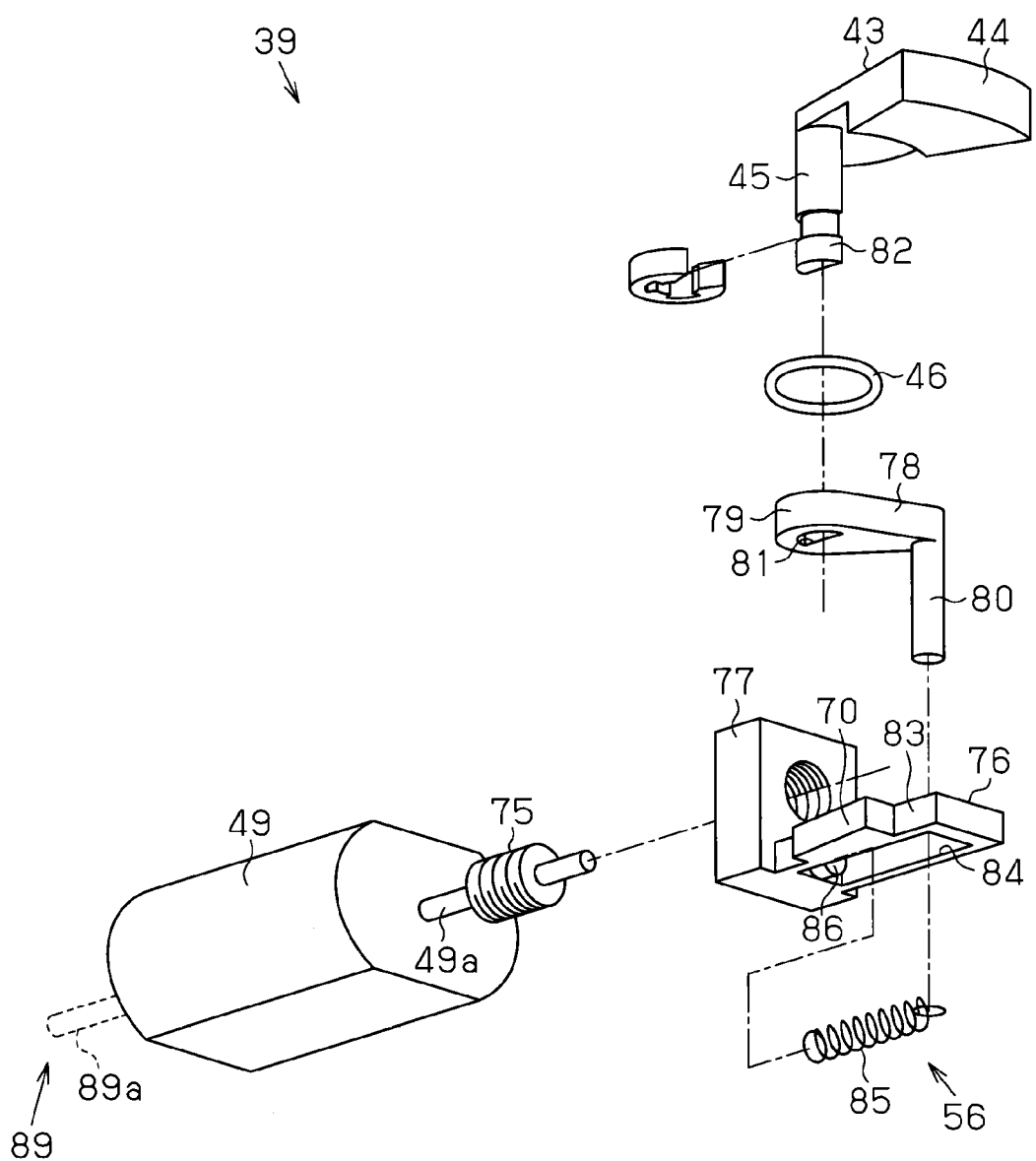
FIG. 16 is an exploded perspective view showing the structure of a lock mechanism according to a second embodiment of the present invention.

As shown in FIG. 16, a threaded portion 75 is formed on a distal part of the motor shaft 49a. A lock plate 76 is coupled to the threaded portion 75. The lock plate 76 includes a basal end on which a nut 77 is formed. The nut 77 is engageable with the threaded portion 75. That is, the threaded portion 75 of the motor shaft 49a is engaged with the nut 77 to couple the motor 49 and the lock plate 76. Thus, the threaded portion 75 and nut 77 convert the rotation force of the motor 49 to linear movement of the lock plate 76. The lock plate 76 corresponds to a plate member.

A lever 78 is coupled to the shaft 45 of the lock bar 43. In the second embodiment, the lock plate 76 and the lever 78 serve as a conversion member that converts the rotation force of the motor 49 to pivoting force of the lock bar 43. The lever 78 includes a plate-shaped lever body 79 and a rod-shaped connection pin 80, which projects from the lever body 79. A D-shaped coupling hole 81 extends through the lever body 79. The shaft 45 includes a distal end that defines a D-shaped coupling portion 82. The coupling portion 82 is fitted into the coupling hole 81 to couple the lever 78 and the lock bar 43.

A spring 85 (connection member), which forms an absorption mechanism 56, connects the lock plate 76 to the lever 78. The lock plate 76 includes a plate body 83. An elongated hole 84 extends through the plate body 83 in the longitudinal direction of the lock plate 76. In the same manner as the first embodiment, in the second embodiment, when pivoting of the lock bar 43 becomes obstructed by an obstacle such as the lock arm 31, the absorption mechanism 56 absorbs the pivoting motion of the lock bar 43 with the spring 85 and permits movement of the lock plate 76 (i.e., driving of the motor 49).

The spring 85 is arranged between the lock plate 76 and the lever 78 in the elongated hole 84 of the lock plate 76. The spring 85 has one end coupled to a projection 86, which projects from the edge of the elongated hole 84 that is adjacent to the nut 77, and another end connected to the connection pin 80 of the lever 78. The spring 85 urges the lock plate 76 and the lever 78 away from each other.

Figure 17A:
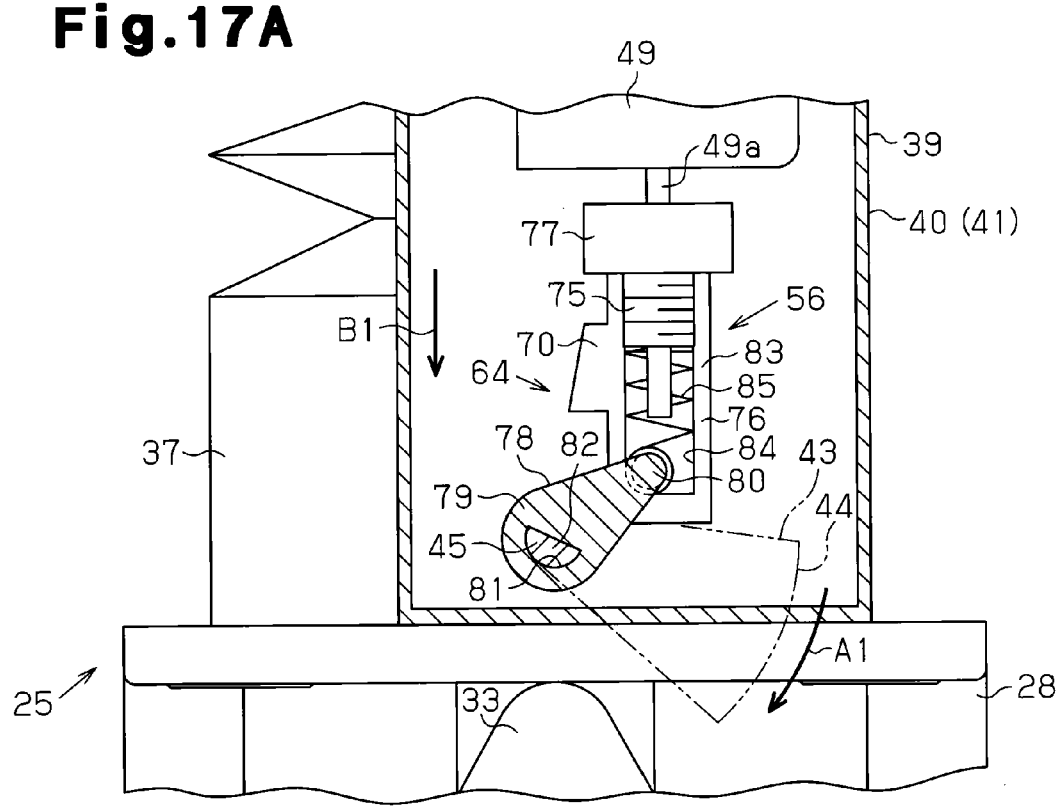
FIG. 17A is a cross-sectional plan view showing the lock mechanism of FIG. 16 in an unlock state.
Figure 17B:
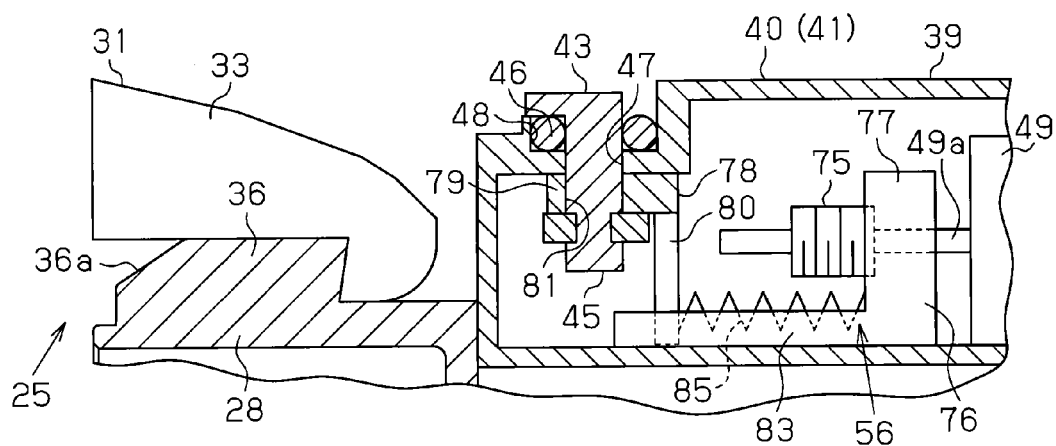
FIG. 17B is a cross-sectional side view showing the lock mechanism of FIG. 16 in the unlock state.
Figure 18A:
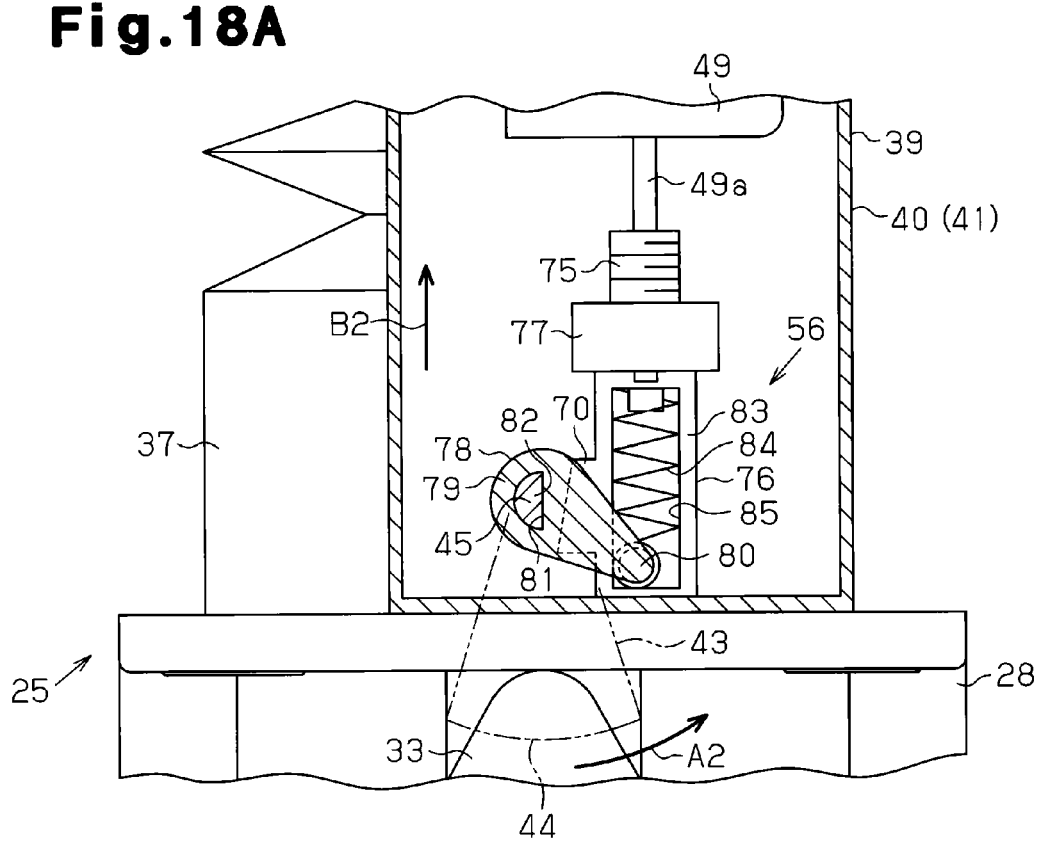
FIG. 18A is a cross-sectional plan view showing the lock mechanism of FIG. 16 in a lock state.
Figure 18B:
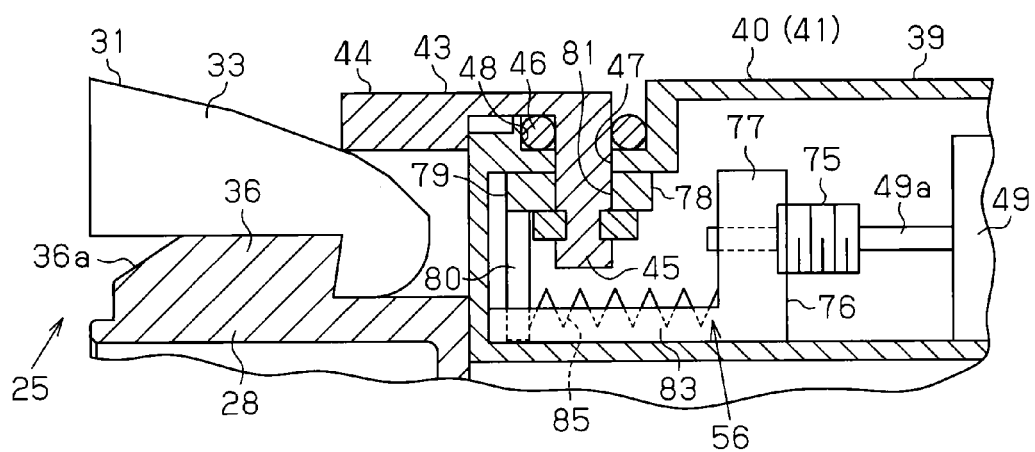
FIG. 18B is a cross-sectional side view showing the lock mechanism of FIG. 16 in the lock state.

As shown in FIG. 17, when the lock mechanism 39 is in an unlock state and the motor 49 generates drive force that produces rotation in one direction (forward direction), the motor 49 linearly moves the lock plate 76 in the direction of arrow B1. Since the lock plate 76 is connected to the connection pin 80 (lever 78) by the spring 85, the lock plate 76 forces the connection pin 80 of the lever 78 in the same B1 direction. Accordingly, the lever 78 and the lock bar 43 are pivoted integrally in the arrow A1 direction as shown in FIG. 17. Then, as shown in FIG. 18, when the lock bar 43 moves outward over the hook 33 and holds the hook 33 from above, the lock mechanism 39 shifts to a lock state.

When the lock mechanism 39 is in a lock state and the motor 49 generates drive force that produces rotation in the other direction (reverse direction), the motor 49 linearly moves the lock plate 76 in the direction of arrow B2. In this state, the lock plate 76 and the spring 85 draw in the connection pin 80 of the lever 78. Accordingly, the lever 78 and the lock bar 43 are pivoted integrally in the arrow A2 direction as shown in FIG. 18. Then, as shown in FIG. 17, when the lock bar 43 is separated from the hook 33, the lock mechanism 39 shifts to an unlock state.

As shown in FIG. 16, the lock plate 76 includes a side portion defining a guide 70, which forms a deadlock mechanism 64. The guide 70 is inclined and has a width that gradually increases from a basal end, which is located near the nut 77, to a distal end. Although not illustrated, in the same manner as the first embodiment, in the second embodiment, the case 40 includes the deadlock pin 65, which is provided with the guide wall 69 that comes into contact with the guide 70, and the urging member 66, which urges the deadlock pin 65. Further, the shaft of the lock bar 43 includes the hooking groove 67, which receives the deadlock pin 65, at the lock position.

Figure 19:
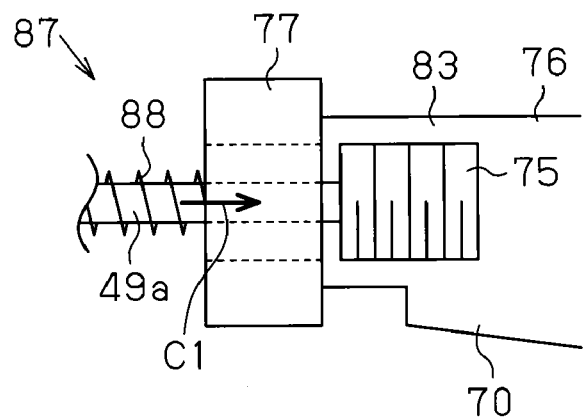
FIG. 19 is a diagram illustrating the movement of an idle rotation prevention mechanism of the lock mechanism of FIG. 16.
Figure 20:
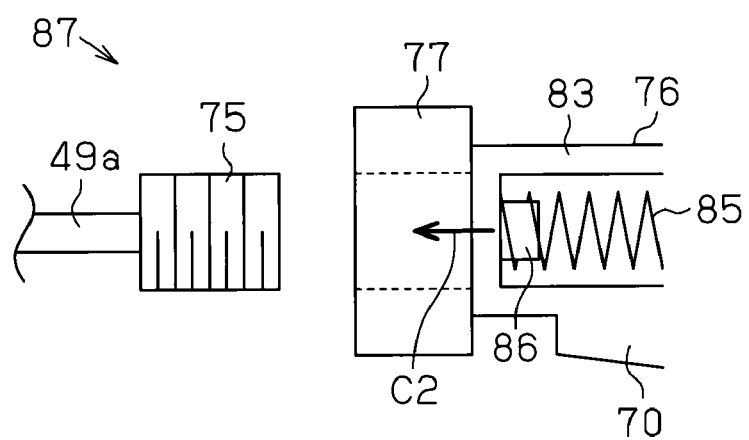
FIG. 20 is a diagram illustrating the movement of the idle rotation prevention mechanism of the lock mechanism of FIG. 16.

As shown in FIGS. 19 and 20, an idle rotation prevention mechanism 87 is arranged between the motor 49 and the lock plate 76 to prevent idle rotation of the motor 49 when the motor 49 is disconnected from the lock plate 76. When the motor 49 produces excessive rotation and the threaded portion 75 of the motor shaft 49a becomes disengaged from the nut 77, the motor 49 produces idle rotation. To prevent the idle rotation, the idle rotation prevention mechanism 87 re-connects the lock plate 76 to the motor 49 and prepares for the next operation (locking or unlocking) of the lock mechanism 39. The idle rotation prevention mechanism 87 corresponds to a recovery mechanism.

In the present example, the idle rotation prevention mechanism 87 includes a first return spring 88, which prevents idle rotation when locking starts, and a second return spring 85, which prevents idle rotation when unlocking starts. As shown in FIG. 19, the first return spring 88 is held between a wall of the nut 77 and an opposing support wall. The support wall may be the case 40 of the motor 49 or a wall of the case 40 located near the motor 49. For example, the first return spring 88 may be wound around the motor shaft 49a. The first return spring 88 accumulates urging force between the nut 77 and the support wall when the lock mechanism 39 is performing unlocking. Referring to FIG. 19, when the lock plate 76 (nut 77) is separated from the threaded portion 75 of the motor 49, the first return spring 88 pushes the lock plate 76 from the rear with an urging force acting in the arrow C1 direction. This re-engages the nut 77 with the threaded portion 75. Accordingly, idle rotation is prevented when the lock mechanism 39 starts performing locking the next time.

As shown in FIG. 20, the second return spring 85 is the above-mentioned spring 85. That is, the spring 85 is used commonly for each of the absorption mechanism 56 and the idle rotation prevention mechanism 87. The second return spring 85 accumulates urging force between the lock plate 76 and the lever 78 (connection pin 80) when the lock mechanism 39 is performing locking. Referring to FIG. 20, when the lock plate 76 (nut 77) is separated from the threaded portion 75, the second return spring 85 pushes the lock plate 76 from the rear with an urging force in the arrow C2 direction. This re-engages the nut 77 with the threaded portion 75. Accordingly, idle rotation is prevented when the lock mechanism 39 starts performing unlocking the next time.

In this manner, when the lock plate 76 is separated from the motor 49 as the lock mechanism 39 performs unlocking, the first return spring 88 reconnects the lock plate 76 and motor 49 and prepares for the next locking to be started.

Accordingly, the motor 49 does not produce idle rotation during locking and properly transmits rotation force to the lock plate 76. This linearly moves the lock plate 76 in the direction of arrow B1 as shown in FIG. 17 and pushes the lever 78. As a result, the lock bar 43 is pivoted in the direction of arrow A1 together with the lever 78 until the lock bar 43 is located above the hook 33. This shifts the lock mechanism 39 to the lock state.

Further, when the lock plate 76 is separated from the motor 49 as the lock mechanism 39 performs locking, the second return spring 85 reconnects the lock plate 76 and motor 49 and prepares for the next unlocking to be started. Accordingly, the motor 49 does not produce idle rotation during unlocking and properly transmits rotation force to the lock plate 76. This linearly moves the lock plate 76 in the direction of arrow B2 as shown in FIG. 18. As a result, the lock bar 43 is pivoted in the direction of arrow A2 together with the lever 78 until the lock bar 43 is away from the hook 33. This shifts the lock mechanism 39 to the unlock state.

In addition to advantages (1) to (5) of the first embodiment, the locking device 38 of the second embodiment has the advantages described below.

(9) The lock plate 76 and the lever 78 convert the drive force of the motor 49 to pivoting force of the lock bar 43. This pivots the lock bar 43 between the lock position and the unlock position. Thus, the lock mechanism 39 has a simple structure, which includes a plate member and a lever.

(10) The lock mechanism 39 includes the idle rotation prevention mechanism 87 that, when the lock plate 76 is separated from the motor 49, reengages the lock plate 76 and motor 49. Thus, even when the motor 49 rotates excessively thereby separating the lock plate 76 from the threaded portion 75, the idle rotation prevention mechanism 87 reengages the lock plate 76 and the threaded portion 75. This allows for locking and unlocking to be performed without any problems.

(11) The same spring 85 is used to connect the lock plate 76 and the lever 78 and to serve as a return spring. This reduces the number of components.

It should be apparent to those skilled in the art that the present invention may be embodied in many other specific forms without departing from the spirit or scope of the invention. Particularly, it should be understood that the present invention may be embodied in the following forms.

In the first and second embodiments, as shown in FIGS. 6 and 16, a manual unlocking mechanism 89 may be used to manually shift the lock mechanism 39 from a lock state to an unlock state. In this case, a manual operation shaft 89a extending in a direction opposite to the motor shaft 49a may be arranged on the motor 49. The manual operation shaft 89a may be manually rotated to rotate the motor shaft 49a and shift the lock mechanism 39 from the lock state to the unlock state. The manual operation shaft 89a may also be arranged on, for example, the lock bar 43 or the worm wheel 53 (lock plate 76).

Figure 21:
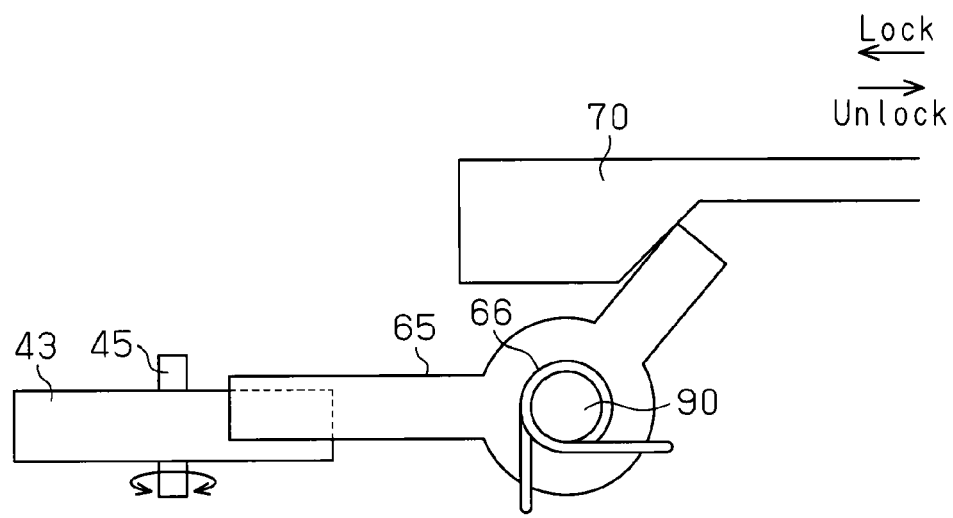
FIG. 21 is a schematic diagram showing a further example of a deadlock mechanism.

In the first and second embodiments, the deadlock pin 65 does not have to move linearly. As shown in FIG. 21, the deadlock pin 65 may be pivotal about a shaft 90. The deadlock pin 65 is pivoted in accordance with the movement of the worm wheel 53 (lock plate 76) to shift between lock and unlock states.

Figure 22:
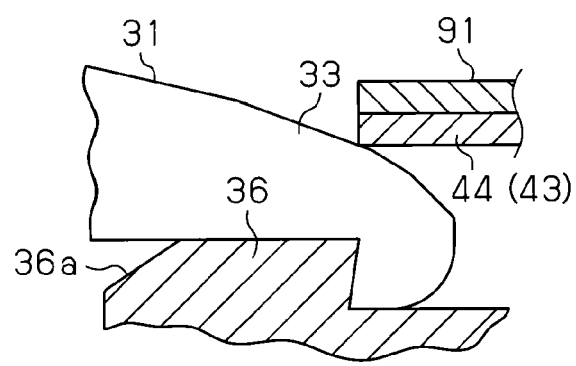
FIG. 22 is a schematic diagram showing a further example of a lock mechanism.

In the first and second embodiments, as shown in FIG. 22, for example, a support wall 91 may be arranged above the lock bar 43 in the case 40. In the lock state, the support wall 91 supports the lock bar 43 from above. This reinforces the lock bar 43 against damaging and makes it difficult to shift the lock mechanism 39 to an unlock state in an unauthorized manner.

In the first and second embodiments, plate-shaped members broadly include thin plates and thick plates. Further, the lock bar 43 does not have to be generally triangular and may be, for example, circular or tetragonal.

In the first and second embodiments, the shaft 45 does not have to be arranged near an end of the restriction plate 44. For example, the shaft 45 may be arranged at the central part of the restriction plate.

In the first and second embodiments, the actuator does not have to be the motor 49 and may be, for example, a solenoid.

In the first and second embodiments, the lock bar 43 is located above the worm gear 52 (lock plate 76) in the lock mechanism 39. However, the lock mechanism 39 is not limited to such a layout. For example, the lock bar 43 may be located below the worm gear 52.

In the first and second embodiments, the absorption mechanism 56 may be formed by any structure as long as play is provided between the lock bar 43 and the worm wheel 53 (lock plate 76) and a spring connects the lock bar 43 and the worm wheel 53 (lock bar 43).

In the first and second embodiments, the layout and shapes of the lock bar 43, worm wheel 53, spring 57, lock plate 76, lever 78, and spring 85 may be changed as long as the movements described above are enabled. The same applies to the deadlock mechanism 64 and the idle rotation prevention mechanism 87.

In the first embodiment, the worm gear 52 may be directly coupled to the lock bar 43.

In the second embodiment, the connection pin 80 may be directly formed on the lock bar 43.

In the first and second embodiments, the seal 46 is not limited to an O-ring and other members such as a packing may be used.

In the first and second embodiments, the lock mechanism 39 does not have to hold and lock the hook 33 of the lock arm 31 from above with the lock bar 43 of the power receiving connector 25. For example, a pin may be hooked to the power feeding plug 23 to fix the power feeding plug 23 to the inlet 28.

In the first and second embodiments, the lock arm 31 may be arranged to be upside down.

The structures of the first and second embodiments may be applied to each other.

In the first and second embodiments, the absorption mechanism 56, the deadlock mechanism 64, and the idle rotation prevention mechanism 87 may be eliminated.

In the first and second embodiments, the vehicle 1 is not limited to a hybrid vehicle and may be, for example, an electric vehicle.

The present examples and embodiments are to be considered as illustrative and not restrictive, and the invention is not to be limited to the details given herein, but may be modified within the scope and equivalence of the appended claims.

The invention claimed is:

1. A locking device for a power feeding plug that prevents unauthorized removal of the power feeding plug from an inlet, wherein the power feeding plug includes a lock arm that is pivotally coupled to the power feeding plug and engageable with the inlet, the locking device comprising:
    a lock mechanism that locks the power feeding plug to the inlet, wherein the lock mechanism includes:
    an actuator that generates drive force; and
    a lock member including a planar surface, wherein the lock member is pivotable in a plane that is parallel to the planar surface by the drive force of the actuator so that the lock member is pivoted to a lock position at which the lock member locks the power feeding plug to the inlet by restricting pivoting of the lock arm engaged with the inlet.

2. The locking device according to claim 1, further comprising a seal arranged between the lock member and a location to which the lock member is coupled, wherein the seal prevents fluid from entering the lock mechanism.

3. The locking device according to claim 1, further comprising an absorption mechanism that absorbs pivoting force of the lock member while permitting driving of the actuator when an obstacle obstructs pivoting of the lock member to the lock position, wherein the absorption mechanism automatically moves the lock member to the lock position with the absorbed pivoting force when the obstacle is removed.

4. The locking device according to claim 3, wherein the absorption mechanism further includes:
    a conversion member that converts the drive force of the actuator to the pivoting force of the lock member; and
    a connection member arranged between the conversion member and the lock member to pivot the lock member in cooperation with the conversion member.

5. The locking device according to claim 4, further comprising a deadlock mechanism that holds the lock member at the lock position, wherein
    the deadlock mechanism includes a deadlock member that engages the lock member at the lock position to prohibit pivoting of the lock member, and
    when the conversion member receives the drive force of the actuator and pivots the lock member from the lock position to an unlock position, the deadlock member is disengaged from the lock member in cooperation with the conversion member to release the lock member.

6. The locking device according to claim 5, wherein
the deadlock member includes a hooking portion,
the lock member includes a hooking groove that receives the hooking portion at the lock position, and
the conversion member includes a guide that guides disengagement of the hooking portion from the hooking groove when the conversion member is driven by the actuator.

7. The locking device according to claim 4, wherein the conversion member includes:
a worm gear coupled to the actuator; and
a worm wheel engaged with the worm gear;
wherein the worm wheel cooperates with the connection member to rotate the lock member between the lock position and an unlock position.

8. The locking device according to claim 4, wherein the conversion member includes:
a plate member linearly movable by the drive force of the actuator and including an elongated hole extending therethrough; and
a connection pin inserted into the elongated hole of the plate member to connect the plate member and the lock member;
wherein the connection pin converts moving force of the plate member to pivoting force of the lock member, and the connection pin cooperates with the plate member and the connection member to rotate the lock member between the lock position and an unlock position.

9. The locking device according to claim 1, further comprising:
a component coupled to the actuator to transmit the drive force of the actuator to the lock member; and
a recovery mechanism that, when excessive operation of the actuator separates the component from the actuator, re-couples the component to the actuator to prepare the lock mechanism for the next operation.

10. The locking device according to claim 1, wherein
the power feeding plug includes a hook, and
when the drive force of the actuator rotates the lock member to a position at which the lock member is engageable with the hook of the power feeding plug, the lock mechanism is held in a lock state.

11. A power receiving connector with a locking device for preventing unauthorized removal of a power feeding plug, wherein the power receiving connector includes an inlet for receiving the power feeding plug, and the power feeding plug includes a lock arm that is pivotally coupled to the power feeding plug and engageable with the inlet, the power receiving connector comprising the locking device, wherein the locking device comprises:
a lock mechanism that locks the power feeding plug to the inlet, wherein the lock mechanism includes:
an actuator that generates drive force; and
a lock member including a planar surface, wherein the lock member is pivotable in a plane that is parallel to the planar surface by the drive force of the actuator so that the lock member is pivoted to a lock position at which the lock member locks the power feeding plug to the inlet by restricting pivoting of the lock arm engaged with the inlet.

12. The power receiving connector with a locking device according to claim 11, further comprising a seal arranged between the lock member and a location to which the lock member is coupled, wherein the seal prevents fluid from entering the lock mechanism.

13. The power receiving connector with a locking device according to claim 11, further comprising an absorption mechanism that absorbs pivoting force of the lock member while permitting driving of the actuator when an obstacle obstructs pivoting of the lock member to the lock position, wherein the absorption mechanism automatically moves the lock member to the lock position with the absorbed pivoting force when the obstacle is removed.

14. The power receiving connector with a locking device according to claim 13, wherein the absorption mechanism further includes:
a conversion member that converts the drive force of the actuator to the pivoting force of the lock member; and
a connection member arranged between the conversion member and the lock member to pivot the lock member in cooperation with the conversion member.

15. The power receiving connector with a locking device according to claim 14, further comprising a deadlock mechanism that holds the lock member at the lock position, wherein
the deadlock mechanism includes a deadlock member that engages the lock member at the lock position to prohibit pivoting of the lock member, and
when the conversion member receives the drive force of the actuator and pivots the lock member from the lock position to an unlock position, the deadlock member is disengaged from the lock member in cooperation with the conversion member to release the lock member.

16. The power receiving connector with a locking device according to claim 15, wherein
the deadlock member includes a hooking portion,
the lock member includes a hooking groove that receives the hooking portion at the lock position, and
the conversion member includes a guide that guides disengagement of the hooking portion from the hooking groove when the conversion member is driven by the actuator.

17. The power receiving connector with a locking device according to claim 14, wherein the conversion member includes:
a worm gear coupled to the actuator; and
a worm wheel engaged with the worm gear;
wherein the worm wheel cooperates with the connection member to rotate the lock member between the lock position and an unlock position.

18. The power receiving connector with a locking device according to claim 14, wherein the conversion member includes:
a plate member linearly movable by the drive force of the actuator and including an elongated hole extending therethrough; and
a connection pin inserted into the elongated hole of the plate member to connect the plate member and the lock member;
wherein the connection pin converts moving force of the plate member to pivoting force of the lock member, and the connection pin cooperates with the plate member and the connection member to rotate the lock member between the lock position and an unlock position.

19. The power receiving connector with a locking device according to claim 11, further comprising:
a component coupled to the actuator to transmit the drive force of the actuator to the lock member; and
a recovery mechanism that, when excessive operation of the actuator separates the component from the actuator, re-couples the component to the actuator to prepare the lock mechanism for the next operation.

20. The power receiving connector with a locking device according to claim 11, wherein
the power feeding plug includes a hook, and
when the drive force of the actuator rotates the lock member to a position at which the lock member is engageable with the hook of the power feeding plug, the lock mechanism is held in a lock state.

* * * * *